(12) United States Patent
Oka

(10) Patent No.: US 7,889,974 B2
(45) Date of Patent: Feb. 15, 2011

(54) METHOD AND APPARATUS FOR EDITING IMAGES, AND METHOD AND APPARATUS FOR REPRODUCING THE EDITED IMAGES

(75) Inventor: Masaaki Oka, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 1961 days.

(21) Appl. No.: 10/730,881

(22) Filed: Dec. 9, 2003

(65) Prior Publication Data

US 2004/0136689 A1    Jul. 15, 2004

(30) Foreign Application Priority Data

Dec. 10, 2002 (JP) ............................. 2002-358688
Apr. 24, 2003 (JP) ............................. 2003-120407

(51) Int. Cl.
G11B 27/00 (2006.01)
H04N 5/93 (2006.01)

(52) U.S. Cl. ..................... 386/278; 386/344; 386/345; 360/13; 369/83

(58) Field of Classification Search .................... 386/52, 386/64, 68
See application file for complete search history.

(56) References Cited

U.S. PATENT DOCUMENTS

| | | | |
|---|---|---|---|
| 5,377,051 A | 12/1994 | Lane et al. | |
| 5,798,995 A | 8/1998 | Fukushima et al. | |
| 6,463,207 B1 | 10/2002 | Abecassis | |
| 6,496,980 B1 | 12/2002 | Tillman et al. | |
| 6,631,240 B1 | 10/2003 | Salesin et al. | |
| 6,735,253 B1 * | 5/2004 | Chang et al. | 375/240.16 |
| 7,269,839 B2 * | 9/2007 | Negishi et al. | 725/88 |
| 2001/0033295 A1 | 10/2001 | Phillips | |
| 2003/0086692 A1 * | 5/2003 | Hori et al. | 386/69 |

FOREIGN PATENT DOCUMENTS

EP     0 343 634     11/1989

(Continued)

OTHER PUBLICATIONS

Communication pursuant to Article 96(2) EPC for corresponding European Patent Application No. 03 028 249.5-223, dated Oct. 20, 2006.

(Continued)

Primary Examiner—Thai Tran
Assistant Examiner—Girumsew Wendmagegn
(74) Attorney, Agent, or Firm—Katten Muchin Rosenman LLP

(57) ABSTRACT

A reception unit receives data streams. A moving image data for normal reproduction selector acquires moving image data for use with normal reproduction and identification information. A position specifying unit specifies the position at which moving image data for use with special reproduction is present, and so forth. A reproduction unit reproduces moving image data for normal reproduction, at a standard frame rate. An instruction receiving unit receives instructions from a user to the effect that moving image data for special reproduction be reproduced in slow motion. A reproduction determining unit specifies moving image data for special reproduction which are necessary for a slow-motion reproduction. A data acquiring unit acquires, based on the specified position thereof, the moving image data for special reproduction based and reproduces the acquired moving image data in slow motion.

12 Claims, 25 Drawing Sheets

FOREIGN PATENT DOCUMENTS

| | | |
|---|---|---|
| EP | 1 081 956 A1 | 3/2001 |
| FR | 2 820 846 | 8/2002 |
| JP | 8-130733 | 5/1996 |
| JP | 08-163494 | 6/1996 |
| JP | 08-223530 | 8/1996 |
| JP | 09-147472 | 6/1997 |
| JP | 2001-103356 | 4/2001 |
| JP | 2002-010129 | 1/2002 |
| WO | WO 99/52112 | 10/1999 |
| WO | WO 02/102079 | 12/2002 |

OTHER PUBLICATIONS

Communication pursuant to Article 96(2) EPC from corresponding European Patent Application No. 03 028 249.5-2223, dated Mar. 9, 2006.

Klaus Holtz. Autosophy Image Compression for Packet Network Television Wescon Technical Papers, Western Periodicals Co. North Hollywood, US Nov. 7, 1995, pp. 392-397.

Partial European Search Report dated Jul. 13, 2004.

European Search Report dated Jun. 30, 2005.

Japanese Notification of Reason(s) of Refusal dated Jun. 3, 2008 from Japanese Application No. 2003-120407.

Notification of Reason(s) for Refusal with translation, dated Aug. 26, 2008, for corresponding Japanese Patent Application JP 2003-120407.

European Communication pursuant to Article 94(3) EPC dated Jul. 21, 2009, from the corresponding European Application.

Faisal Ishtiaq. "H.263 Scalable Video Coding and Transmission at Very Low Bitrates" Northwestern University, Jun. 2000.

European Search Report dated Aug. 3, 2010, from the corresponding European Application.

Hiroyuki Katata, et al. "Temporal-Scalable Coding Based on Image Content" IEEE Transactions On Circuits and Systems for Video Technology, vol. 7, No. 1, Feb. 1997, pp. 52-59.

Wook-Joong Kim, et al. "Quality scalable coding of selected region: Its modeling and H.263-based implementation" Signal Processing: Image Communication 15 (1999) pp. 181-188.

HHI Berlin/COST211ter. "Segmentation Based Coding Scheme for Object Scalable and Quality Scalable Coding of Video" ITU Study Group 16- Video Coding Experts Group, Nov. 3, 1995.

\* cited by examiner

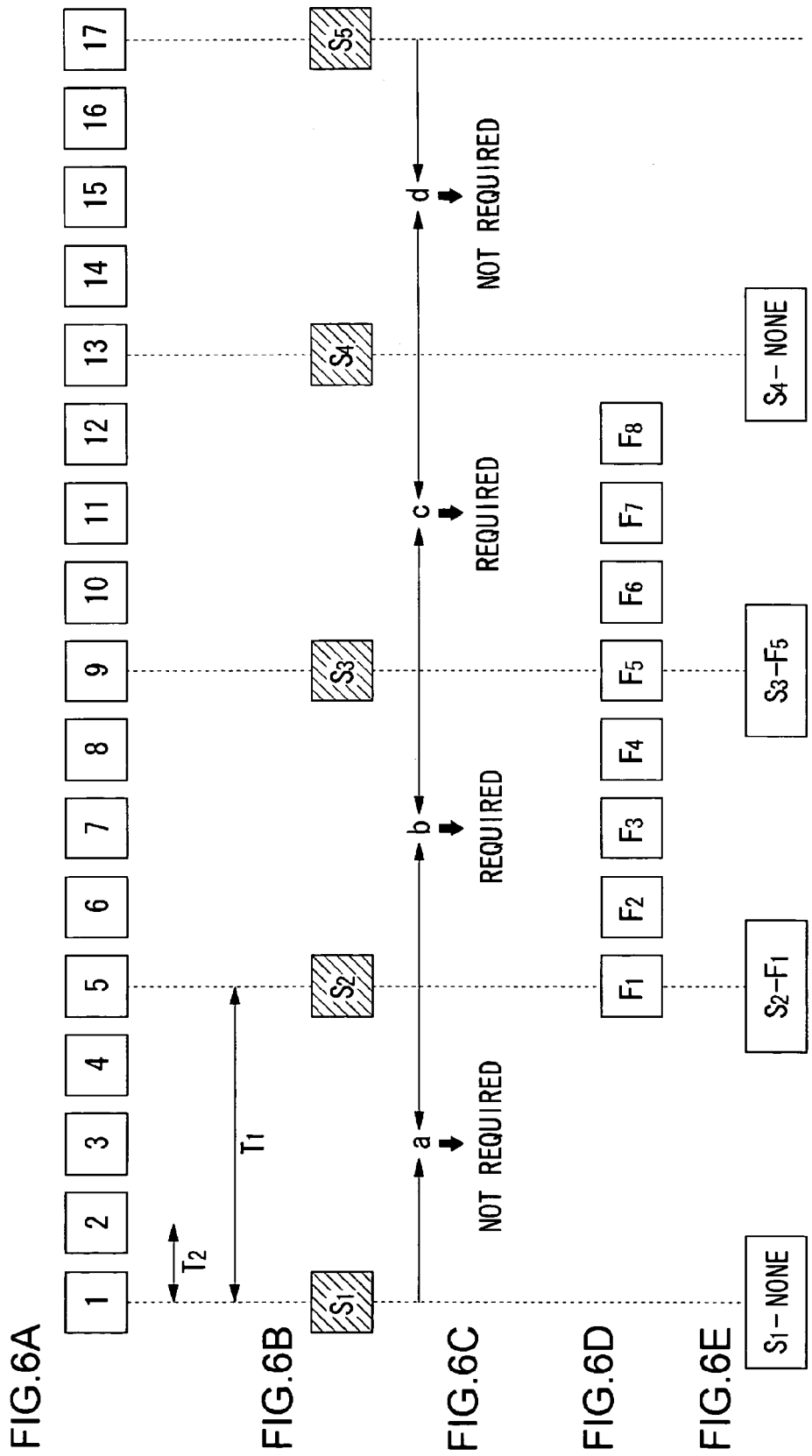

FIG.7A
FIG.7B
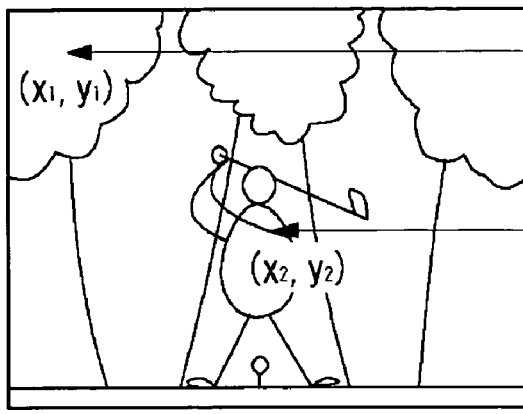
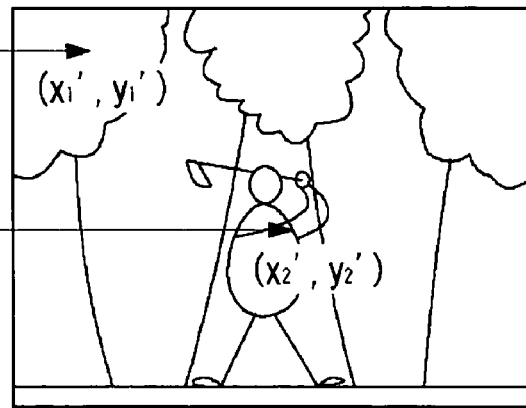

F1-F8: MOVING IMAGE DATA FRAME FOR SPECIAL REPRODUCTION
S1-S10: MOVING IMAGE DATA FRAME FOR NORMAL REPRODUCTION
: MOVING IMAGE DATA PACKET FOR NORMAL REPRODUCTION

FIG.10

| LINE | STORAGE CONTENTS |
|---|---|
| 0 | ID INFO (S1) MOVING IMAGE DATA FRAME FOR NORMAL REPRODUCTION (S1) |
| 1 | ID INFO (S2) MOVING IMAGE DATA FRAME FOR NORMAL REPRODUCTION (S2) |
| 9 | ID INFO (S10) MOVING IMAGE DATA FRAME FOR NORMAL REPRODUCTION (S10) |
| 1799 | ID INFO (S1800) MOVING IMAGE DATA FRAME FOR NORMAL REPRODUCTION (S1800) |
| 1800 | MOVING IMAGE DATA FRAME FOR SPECIAL REPRODUCTION (F1) |
| 1899 | MOVING IMAGE DATA FRAME FOR SPECIAL REPRODUCTION (F100) |
| EOF | |

FIG.13A
FIG.13B
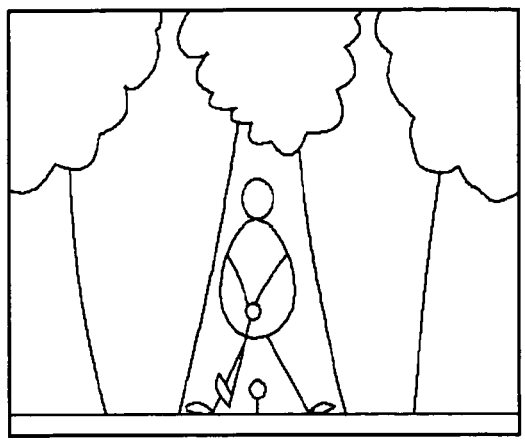
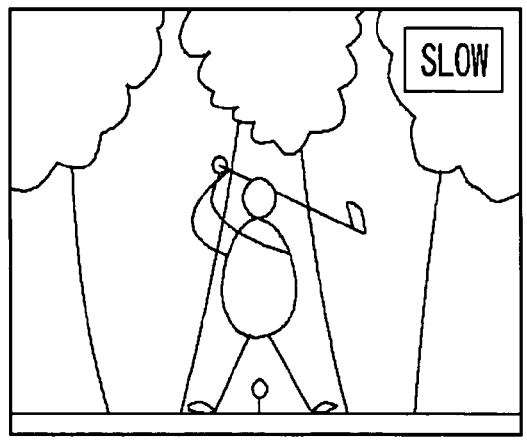
FIG.14
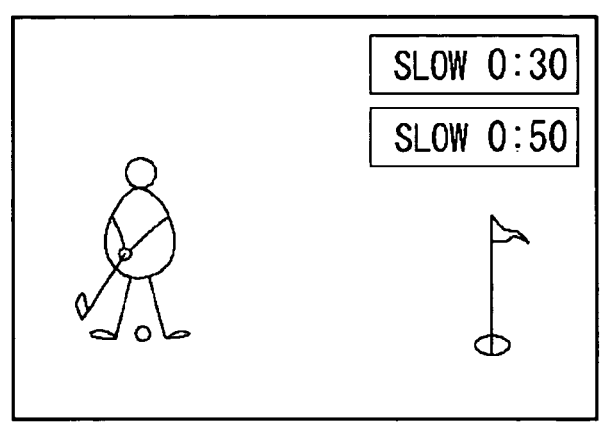

FIG.17A

| S₁ | S₂ | S₃ | S₄ | S₅ |

FIG.17B

| ID INFO | #₁ |

FIG.17C

| FLAG | FRAME RATE | SIZE | POSITION | POINTER ADDRESS |

FIG.17D

| HEADER | F₁ | F₂ | F₃ | ... |

S₁–S₅: MOVING IMAGE DATA PACKET FOR NORMAL REPRODUCTION
₁: MOVING IMAGE DATA FRAME FOR NORMAL REPRODUCTION
F₁–F₃: MOVING IMAGE DATA FRAME FOR SPECIAL REPRODUCTION

METHOD AND APPARATUS FOR EDITING IMAGES, AND METHOD AND APPARATUS FOR REPRODUCING THE EDITED IMAGES

BACKGROUND OF THE INVENTION

1. Field of the Invention

The present invention relates to the image editing technology and the image reproducing technology, and it particularly relates to method and apparatus for editing images by generating moving images having a plurality of frame rates from a single moving image, and method and apparatus for reproducing the thus edited moving images.

2. Description of the Related Art

Moving images generated at a predetermined frame rate are transmitted in television broadcasting and sometimes in the broadcasting or image distribution using the Internet. Generally, these moving images are reproduced by a reproducing apparatus at the same frame rate as was used in generating the moving images. There are also cases where slow-motion reproduction can be carried out by a reproducing apparatus at a frame rate lower than that for generating the moving images. The display in slow-motion reproduction is generally speaking smoother when the moving images are initially generated at a higher frame rate (see Related Art List (1) below).

Relate Art List (1) JP Laid-open Publication No. 2002-10129 A, claims 6-12, FIG. 1.

Employing a higher frame rate in generating moving images proves effective in realizing a smoother slow-motion reproduction of moving images. And transmission of such moving images through a communication line, for example, requires a wider transmission band. However, in terms of communication stability, frequency utilization efficiency, communication cost and so forth, a narrower transmission band for the moving images is preferred at any timing of the transmission.

SUMMARY OF THE INVENTION

The present invention has been made in view of the foregoing circumstances and objects thereof are as exemplified in the following. That is, an object of the present invention is to provide a technology for a smooth slow-motion reproduction of moving images even under conditions such as a narrow transmission band or a small storage capacity. Another object of the present invention is to provide a technology that realizes both slow-motion reproduction with smooth movements and normal real-time reproduction of moving images at the same time. Still another object of the present invention is to provide an image reproduction technology featuring easy operation for slow-motion reproduction.

A preferred embodiment according to the present invention relates to an image editing apparatus. This apparatus includes: an image input unit which inputs original image data to be edited; a first data selector which generates moving image data for normal reproduction having a first frame rate, from the original image data; a second data selector which generates moving image data for special reproduction having a second frame rate that is greater than the first frame rate, for a predetermined section of the moving image data for normal reproduction; and an identification information generator which generates identification information by which to associate the moving image data for normal reproduction with the moving image data for special reproduction.

The "generating" includes extracting part of the original moving image data or utilizing the original moving image as they are.

According to this image editing apparatus, the moving image data for use with normal reproduction and the moving image data for use with special reproduction are associated with each other, so that the moving image data for special reproduction are transmitted at arbitrary timing and the transmission band therefor can be smoothed up.

Another preferred embodiment according to the present invention relates also to an image editing apparatus. This apparatus includes: an image input unit which inputs original image data to be edited; a first data selector which generates moving image data, constituted by image frames having a predetermined amount of information, for use with normal reproduction, from the original image data; a second data selector which generates moving image data for special reproduction, for a predetermined section of the moving image data for normal reproduction, wherein the moving image data for special reproduction are constituted by image frames which have the equal composition to images within the frame images that constitute the moving image data for normal reproduction and which have a different amount of information from the images that constitute the moving image for normal reproduction; and an identification information generator which generates identification information by which to associate the moving image data for normal reproduction with the moving image data for special reproduction.

The "equal composition" means that the position and placement of a predetermined object within an image frame is the same. Here, if an object displayed within one image frame is not displayed within the other image frame, it is regarded as the equal composition as long as the arrangement and its position are the same within the whole frame.

According to this image editing apparatus, the moving image data for use with normal reproduction and the moving image data for use with special reproduction are associated with each other, so that the moving image data for special reproduction are generally being transmitted whereas the moving image data for special reproduction can be transmitted according as the necessity arises.

Still another preferred embodiment according to the present invention relates also to an image editing apparatus. This apparatus includes: an input unit which inputs original image data, to be edited, that are comprised of a plural kinds of image frames having images generated by light of mutually different frequency domains; a first data selector which generates moving image data for normal reproduction, constituted by image frames having images generated by light of a predetermined frequency domain, from among the original image data; a second data selector which generates moving image data for special reproduction from among the original image data, wherein the moving image data for special reproduction are constituted by image frames having images generated by light of a different frequency domain from that of images within image frames constituting the moving image data for normal production; and an identification information generator which generates identification information by which to associate the moving image data for normal reproduction with the moving image data for special reproduction.

According to this image editing apparatus, even if moving image generating apparatuses differ in their optical properties, moving images based on these original images can be transmitted.

Still another preferred embodiment according to the present invention relates also to an image editing apparatus.

This apparatus includes: an input unit which inputs original image data, to be edited, that are comprised of a plural kinds of image frames having images of mutually different resolutions; a first data selector which generates moving image data, constituted by image frames having images of a predetermined resolution, for use with normal reproduction, from among the original image data; a second data selector which generates moving image data for special reproduction from among the original image data, wherein the moving image data for special reproduction are constituted by images having a different resolution from that of images within image frames constituting the moving image data for normal production; and an identification information generator which generates identification information by which to associate the moving image data for normal reproduction with the moving image data for special reproduction.

The "different resolutions" include not only a case where the resolution differs in images but also a case where differs the focal length of lens that generates images.

According to this image editing apparatus, even if the original moving images differs in their resolution, moving images based on these original moving images can be transmitted.

Still another preferred embodiment according to the present invention relates to an image reproducing apparatus image. This apparatus includes: an input unit which inputs signals for use in at least reproducing images; a first data selector which acquires moving image data for normal reproduction that are generated from the inputted signals at a first frame rate; a position specifying unit which acquires, from the inputted signals, information indicative of a relationship between the moving image data for normal reproduction and moving image data for special reproduction generated at a second frame rate that is greater than the first frame rate, and which specifies from the information a position where the moving image data for special reproduction is present; a second data selector which acquires, from the position specified by the position specifying unit, the moving image data for special reproduction; and a reproduction unit which reproduces the moving image data for normal reproduction and reproduces, as appropriate, the moving image data for special reproduction at a frame rate that is less than the second frame rate.

"A frame rate that is lower than the second frame rate" includes not only a fixed frame rate but also a variable frame rate where the second frame rate is set as the upper limit.

According to this image reproducing apparatus, moving image data are generated at a higher frame rate, so that a smooth slow-motion reproduction of moving images can be performed.

Still another preferred embodiment according to the present invention relates also to an image reproducing apparatus image. This apparatus includes: an input unit which inputs signals for use in at least reproducing images; a first data selector which acquires moving image data, constituted by image frames having a predetermined amount of information, for use with normal reproduction, from the signals inputted in said input unit; a position specifying unit which acquires, from the inputted signals, information indicative of a relationship between moving image data for special reproduction and the moving image data for normal reproduction, and which specifies from the information a position where the moving image data for special reproduction is present, wherein the moving image data for special reproduction are constituted by image frames which have the equal composition to images within the frame images that constitute the moving image data for normal reproduction and which have a different amount of information from the images that constitute the moving image for normal reproduction; a second data selector which acquires, from the position specified by the position specifying unit, the moving image data for special reproduction; and a reproduction unit which reproduces the moving image data for normal reproduction and reproduces, as appropriate, the moving image data for special reproduction.

According to this image reproducing apparatus, moving image data for special reproduction have a different amount of information from that of moving image data for normal reproduction, so that a reproduction of moving images according to the contents of moving images can be realized.

Still another preferred embodiment according to the present invention relates also to an image reproducing apparatus image. This apparatus includes: an input unit which inputs signals for use in at least reproducing images; a first data selector which acquires moving image data, constituted by image frames having images generated by light with a predetermined frequency domain, for use with normal reproduction, from the signals inputted in said input unit; a position specifying unit which acquires, from the inputted signals, information indicative of a relationship between moving image data for special reproduction and the moving image data for normal reproduction, and which specifies from the information a position where the moving image data for special reproduction is present, wherein the moving image data for special reproduction are constituted by image frames having images generated by light with a different frequency domain from that of images within image frames constituting the moving image data for normal production; a second data selector which acquires, from the position specified by the position specifying unit, the moving image data for special reproduction; and a reproduction unit which reproduces the moving image data for normal reproduction and reproduces, as appropriate, the moving image data for special reproduction.

According to this image reproducing apparatus, in addition to a reproduction of moving images by using moving image data for normal reproduction, moving images by moving image data for special reproduction generated by a moving image generating apparatus having an optical property different from moving image data for normal reproduction can be reproduced.

Still another preferred embodiment according to the present invention relates also to an image reproducing apparatus image. This apparatus includes: an input unit which inputs signals for use in at least reproducing images; a first data selector which acquiring moving image data, constituted by image frames having images having a predetermined resolution, for use with normal reproduction, from the signals inputted in said input unit; a position specifying unit which acquires, from the inputted signals, information indicative of a relationship between moving image data for special reproduction and the moving image data for normal reproduction, and which specifies from the information a position where the moving image data for special reproduction is present, wherein the moving image data for special reproduction are constituted by image frames having images having a different resolution from that of images within image frames constituting the moving image data for normal production; a second data selector which acquires, from the position specified by the position specifying unit, the moving image data for special reproduction; and a reproduction unit which reproduces the moving image data for normal reproduction and reproduces, as appropriate, the moving image data for special reproduction.

According to this image reproducing apparatus, in addition to a reproduction of moving images by using moving image data for special reproduction, moving images by moving image data for special reproduction whose resolution is higher than that of moving image data for normal reproduction can be reproduced.

Moving image data for special reproduction are provided for a partial area within an image frame that constitutes moving image data for normal reproduction. When reproducing moving image data for special reproduction, the reproduction unit may reproduce said moving image data for special reproduction for the partial area. Moreover, moving image data for special reproduction are provided for a predetermined section of moving image data for normal reproduction. The reproduction unit may reproduce, as appropriate, moving image data for special reproduction, for said predetermined section.

It is to be noted here that the "partial area" and the "predetermined section" also contain the extreme cases of the whole area and the whole section, respectively.

Still another preferred embodiment according to the present invention relates to a data structure. This data structure includes: a first data part which stores moving image data, defined by a first frame rate, for use with normal reproduction; a second data part which stores moving image for use with special reproduction, defined by a second frame rate that is greater than the first frame rate, for a predetermined section of the moving image data for use with normal; and a third data part which stores information that associates the first data part with the second data part. In this structure, the first data part and the third data part are arranged in close proximity from each other, and the second data part is placed at an area which is not occupied by the first and second data parts.

According to this data structure, when data of the first data part are to be read, it is easy to read data of the third data part which lies in the close proximity of this data of the first data part. Thus, the position of the second data part is specified in accordance with the data of the third data part while the data of the first data part are being reproduced. And access to the second data part is possible when necessary. Hence, this data structure not only facilitates reproducing data of the first data part and makes it possible to utilize data of the second data part, but also can record the second data part itself at arbitrary positions. As a result thereof, this data structure is highly advantageous in terms of memory utilization efficiency.

Still another preferred embodiment according to the present invention relates also to a data structure. This data structure includes: a first data part which stores moving image data, defined by a first frame rate, for use with normal reproduction; a second data part which stores moving image for use with special reproduction, defined by a second frame rate that is greater than the first frame rate, for a predetermined section of the moving image data for use with normal reproduction; and a third data part which stores information that associates said first data part with the second data part, wherein, even in a case when moving image data are read out by an image reproducing apparatus that does not recognize the presence of the second and third data parts, the first data part is placed at a position where a normal reproduction utilizing data in the first data part is carried out.

According to this data structure, the first data part is allocated irrespective of the presence or absence of the second data part and the third data part. Thus, moving image data for normal reproduction transmitted in the form of the first data part can be reproduced by an image reproducing apparatus, such as an existing image reproducing apparatus, which does not recognize the second data part and third data part, so that the so-called upper compatibility can be maintained.

It is to be noted that any arbitrary combination of the above-described structural components and expressions changed between a method, an apparatus, a system, a recording medium, a computer program and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

FIGS. 6A to 6E show frames in the process of generating moving image data for normal reproduction and moving image data for special reproduction according to the image editing apparatus shown in FIG. 4.

FIGS. 7A and FIG. 7B show an example of difference calculation carried out by the image editing apparatus shown in FIG. 4.

FIG. 10 shows a data structure in a logical address space of storage contents in a storage of the image reproducing apparatus shown in FIG. 9.

FIGS. 13A and 13B show a mode of a display screen to reproduce moving image data for normal reproduction according to the image reproducing apparatus shown in FIG. 9.

FIG. 14 shows another mode of a display screen to reproduce moving image data for normal reproduction according to the image reproducing apparatus shown in FIG. 9.

FIGS. 17A to 17D show data structures according to a second embodiment of the present invention.

DETAILED DESCRIPTION OF THE INVENTION

The invention will now be described based on the following embodiments which do not intend to limit the scope of the present invention but exemplify the invention. All of the features and the combinations thereof described in the embodiments are not necessarily essential to the invention.

First Embodiment

An image editing apparatus according to a first embodiment of the present invention is used by moving image suppliers, such as broadcasting stations or image production companies. This apparatus generates moving images not only at normal frame rates but also at higher frame rates for intervals or sections where the movements of display contents of the moving images are large. Any part of the moving images generated by this apparatus may be reproduced in slow motion by an image reproducing apparatus owned by an ordinary user, but it goes without saying that images will be smoother if moving images generated at a higher frame rate are reproduced in slow motion. Thus, image editing by this apparatus offers advantages by improving the image quality in slow-motion reproduction.

Figure 1:
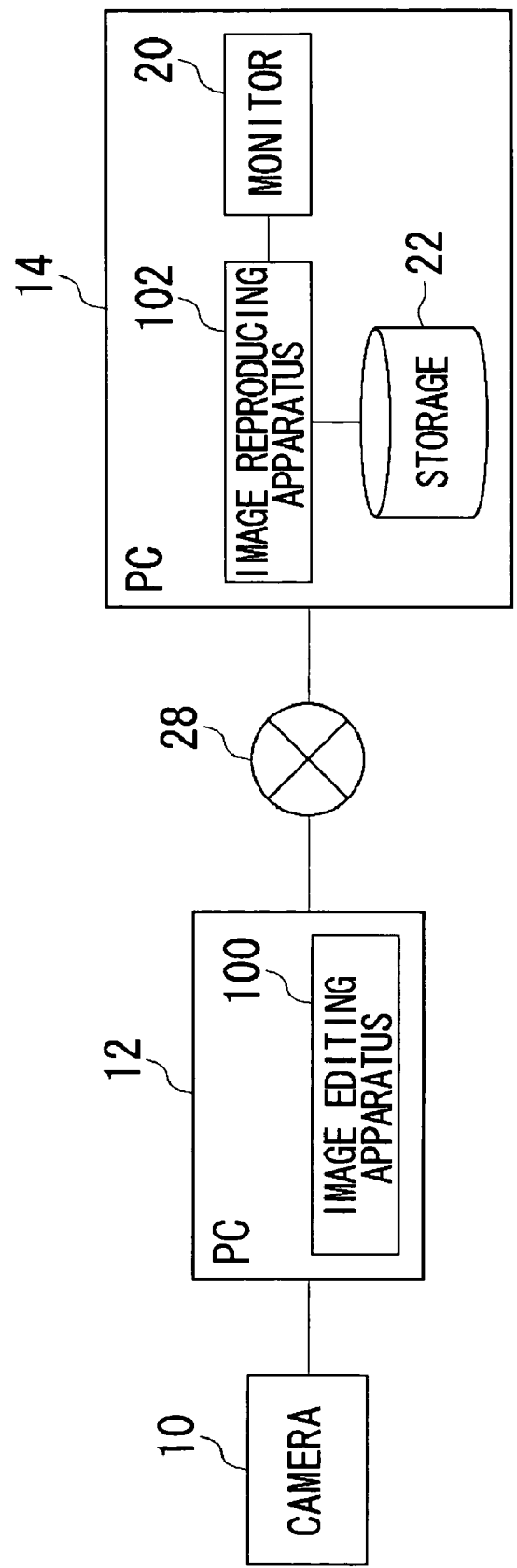
FIG. 1 shows a mode of an image editing apparatus and an image reproducing apparatus according to a first embodiment of the present embodiment.
Figure 2:
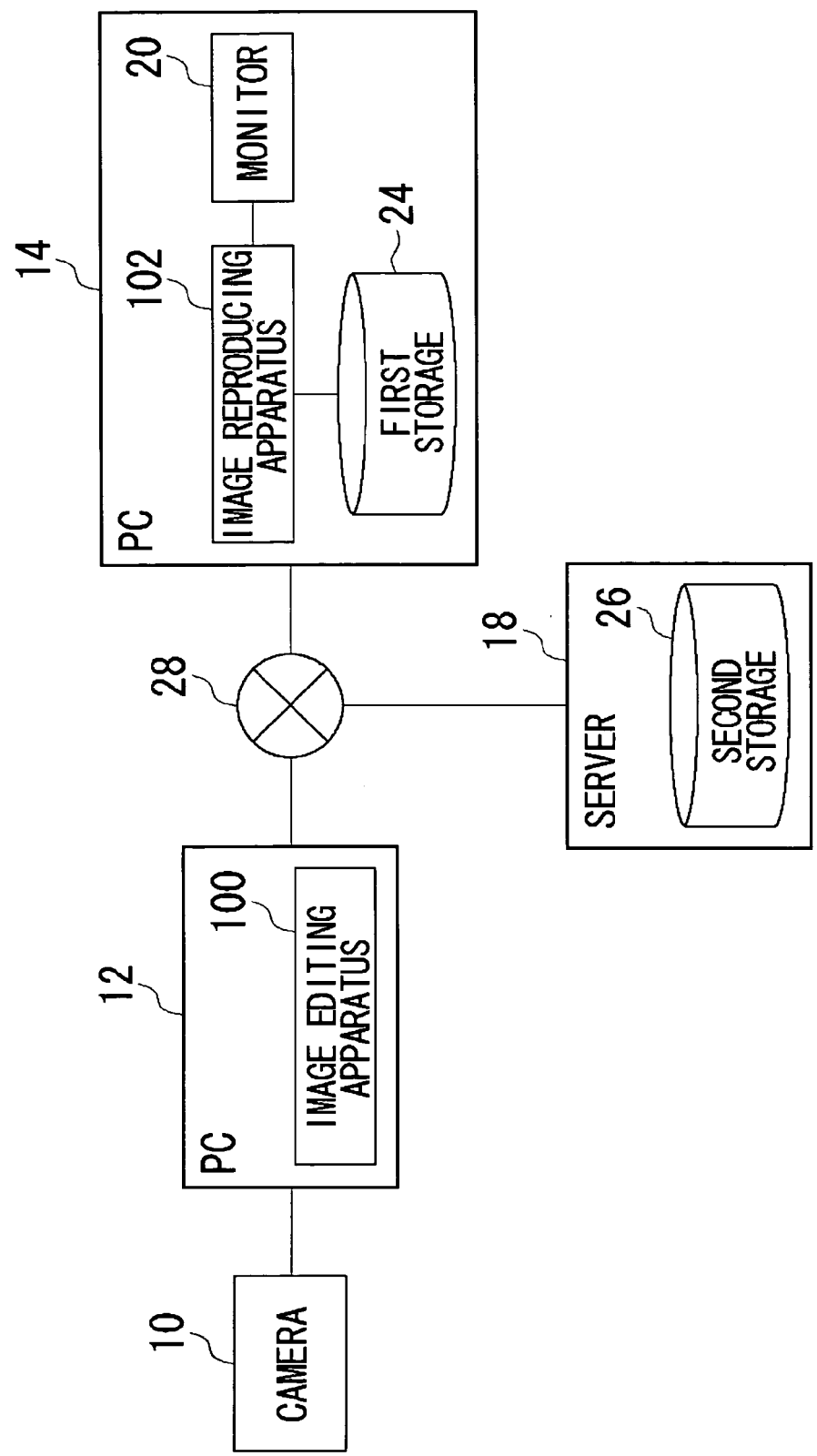
FIG. 2 shows another mode of an image editing apparatus and an image reproducing apparatus according to a first embodiment of the present embodiment.
Figure 3:
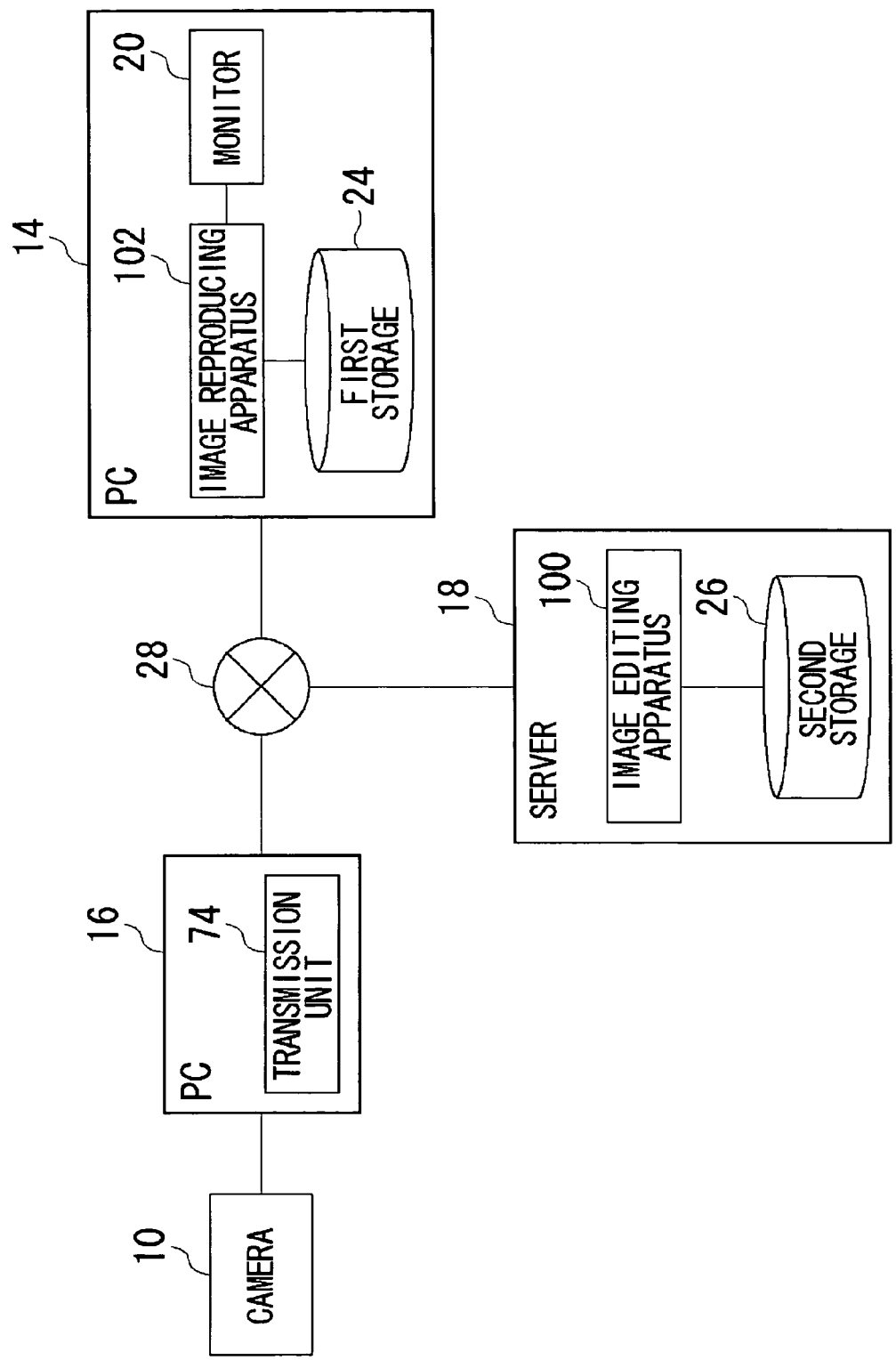
FIG. 3 shows still another mode of an image editing apparatus and an image reproducing apparatus according to a first embodiment of the present embodiment.

FIG. 1 to FIG. 3 show some variety of modes of an image editing apparatus 100 on the image supplier side and an image reproducing apparatus 102 on the image viewer side according to the first embodiment of the present invention. In any of the modes, a system comprises a combination of a camera 10, an image editing apparatus 100, an image reproducing apparatus 102 and a monitor 20. The camera 10 captures images and outputs moving image data to be subjected to editing (hereinafter referred to simply as "original moving image data"). The image editing apparatus 100 extracts moving image data to be subjected to normal reproduction (hereinafter referred to simply as "moving image data for normal reproduction") and moving image data to be subjected to slow-motion reproduction (hereinafter referred to simply as "moving image data for special reproduction") from the original moving image data, correlates them with each other and then transmits them via a network 28. The image reproducing apparatus 102 performs not only normal reproduction of the moving image data for normal reproduction but also slow-motion reproduction of the moving image data for special reproduction. The monitor 20 displays moving images thus reproduced.

The original moving image data may not necessarily be moving image data captured by the camera 10 but may also be moving image data having been recorded in advance on a recording medium such as a CD-ROM. Instead of sending moving image data for normal reproduction or the like to the image reproducing apparatus 102 via the network 28, the image editing apparatus 100 may have a recording medium, such as CD-R, record the moving image data for normal reproduction or the like and have the CD-R recording reproduced by the image reproducing apparatus 102.

In this first embodiment, in order to realize a smooth slow-motion reproduction for intervals or sections where the display contents of moving image data for normal reproduction move considerably, the original moving image data, which are the origin of moving image data for both normal reproduction and special reproduction, are generated at a frame rate (hereinafter referred to as "high-speed frame rate") higher than the frame rate for generating moving image data for normal reproduction (hereinafter referred to as "standard frame rate"). Accordingly, the camera 10 captures images at a speed of 120 frames per second, for instance. For the purpose of slow-motion reproduction, the moving image data for special reproduction are generated by simply extracting a certain interval or section of original moving image data, so that the frame rate therefor is a high-speed frame rate. It is to be noted here that the standard frame rate is set in a manner to correspond to the refresh rate of the monitor 20 on the image viewer side.

In the example of FIG. 1, an editing PC 12 includes an image editing apparatus 100, and a PC for reproduction 14 includes an image reproducing apparatus 102, a monitor 20, and a storage 22 for storing received moving image data for normal reproduction and moving image data for special reproduction and the like. It is not necessary that the editing PC 12 and the PC for reproduction 14 are PCs, but they may be any other devices if they have the similar functions thereto.

In the example of FIG. 2, different from FIG. 1, the storage area for moving image data for normal reproduction and moving image data for special reproduction to be reproduced by an image reproducing apparatus 102 is divided into a first storage 24 and a second storage 26. Moreover, while the first storage 24 is included in a PC for reproduction 14, which includes an image reproducing apparatus 102, the second storage 26 is included in a server 18 separately from the PC for reproduction 14. In this structure, for example, the moving image data for normal reproduction are stored in the first storage 24, and those for special reproduction are stored in the second storage 26, and the moving image data for normal reproduction stored in the first storage 24 are used for normal reproduction. Whenever necessary, the image reproducing apparatus 102 performs slow-motion reproduction by acquiring moving image data for special reproduction from the second storage 26. Accordingly, the image editing apparatus 100 has a function of sending moving image data for normal reproduction and moving image data for special reproduction to the first storage 24 and the second storage 26, respectively. In the structure of FIG. 2, the first storage 24 is supposed to store moving image data for normal reproduction only, so that the capacity of the first storage 24 included in the PC for reproduction 14 may be smaller than the one in FIG. 1.

In the example of FIG. 3, in contrast to the one in FIG. 2, a camera 10 is connected to an image editing apparatus 100 via a network 28. Furthermore, the camera 10 is connected to a PC for camera 16, and the image editing apparatus 100 is included in a server 18. The PC for camera 16 includes a transmission unit 74 to send original moving image data to the network 28. And, in the same manner as in FIG. 2, moving image data for normal reproduction are stored in a first storage 24, and those for special reproduction are stored in a second storage 26. In the structure of FIG. 3, the camera 10 and the PC for camera 16 are only supposed to send captured original moving image data and the server 18 handles the processing of the image editing apparatus 100, so that the processing load of the PC for camera 16 is lighter than that of the editing PC 12 in FIG. 1 or FIG. 2. In a modification of this mode, the camera 10 may include the transmission unit 74, so that the PC for camera 16 is no longer necessary.

Figure 4:
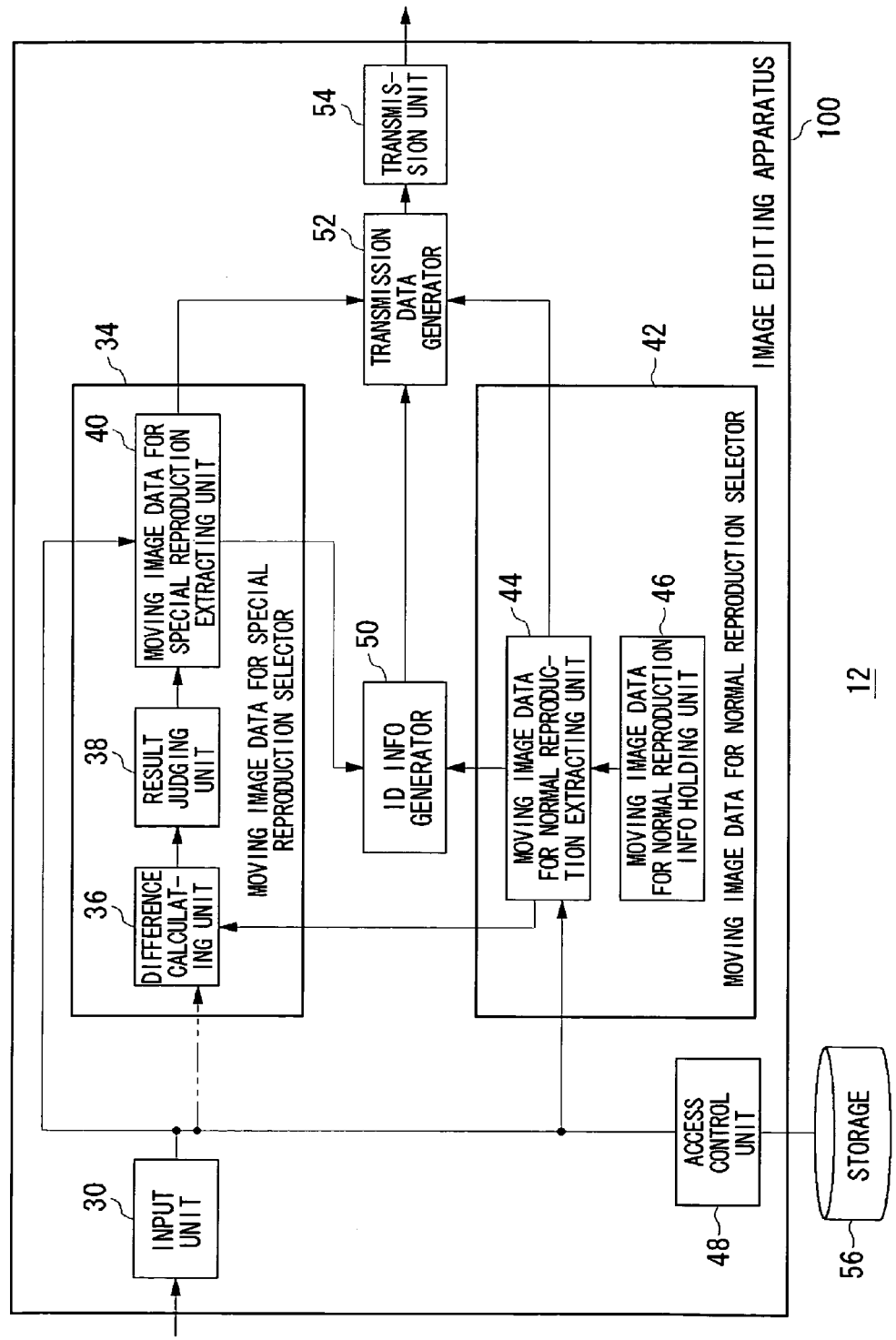
FIG. 4 shows a structure of an image editing apparatus according to the first embodiment of the present invention.

FIG. 4 shows a structure of an image editing apparatus 100 shown in FIG. 1 as an example of the above-described variety of modes. An editing PC 12 includes an image editing apparatus 100 and a storage 56. The image editing apparatus 100 includes an input unit 30, a moving image data for special reproduction selector 34, a moving image data for normal reproduction selector 42, an identification information generator 50, a transmission data generator 52, a transmission unit 54, and an access control unit 48. Further, the moving image data for special reproduction selector 34 includes a difference calculating unit 36, a result judging unit 38 and a moving image data for special reproduction extracting unit 40, whereas the moving image data for normal reproduction selector 42 includes a moving image data for normal reproduction extracting unit 44 and a moving image data for normal reproduction information holding unit 46.

In terms of hardware, the above-described structure can be realized by a CPU, a memory and other LSIs of an arbitrary computer. In terms of software, it is realized by memory-loaded programs or the like, but drawn and described here are function blocks that are realized in cooperation with those. Thus, it is understood by those skilled in the art that these function blocks can be realized in a variety of forms by hardware only, software only, a computer-readable recording medium having stored programs only or the combination thereof.

The input unit 30 inputs original moving image data from a camera 10. Suppose that the original moving image data have a predefined format, such as Motion JPEG (Joint Photographic Coding Experts Group) or MPEG (Moving Picture Experts Group). Or the format may be RGB data format or the like which is not compressed. It is to be noted that when encoded original moving image data are inputted, said data are decoded by a decoder (not shown) in the image editing apparatus 100 before they are processed by the moving image data for special reproduction selector 34 and the moving image data for normal reproduction selector 42.

The storage 56, which is constituted by a storage medium such as a hard disk, stores original moving image data. The storage 56 may be located within the image editing apparatus 100.

The access control unit 48 carries out the processing for writing predetermined data to the storage 56 or reading predetermined data therefrom. Moreover, the access control unit 48 may perform such a control processing as to manage the location of data to be stored by the storage 56.

The moving image data for normal reproduction extracting unit 44 extracts, through a thinning-out processing, moving image data for normal reproduction having a standard frame rate from the original moving image data of a high-speed frame rate inputted from the storage 56 via the access control unit 48. Information on the moving image data for normal reproduction that is required for this extraction is stored in the moving image data for normal reproduction information holding unit 46. This information includes the specification of a leading frame of moving image data for normal reproduction within original moving image data, the frame rate of moving image data for normal reproduction, the frame rate ratio between the original moving image data and the moving image data for normal reproduction, and the like. For example, in response to information that the high-speed frame rate is four times the standard frame rate, the moving image data for normal reproduction extracting unit 44 extracts frames for moving image data for normal reproduction at intervals of one in four frames from the frames constituting the original moving image data. It is to be noted here that information in the moving image data for normal reproduction information holding unit 46 may not only be stored beforehand but may also be recorded via an interface that receives instructions directly from the user. The moving image data for normal reproduction information holding unit 46 and the storage 56 may be constituted by a single storage medium or by separate storage mediums.

The moving image data for special reproduction selector 34 extracts moving image data for special reproduction by cutting out a section of moving image data with large movements from original moving image data generated at a high-speed frame rate. The difference calculating unit 36, which receives an input of moving image data for normal reproduction from the moving image data for normal reproduction extracting unit 44, calculates the difference in display contents between adjacent moving image data for normal reproduction data frames, namely, between a moving image data for normal reproduction data frame and the subsequent moving image data for normal reproduction data frame. Although the details will be discussed later, it is judged that the larger the result of this calculation, the larger the difference in display contents between the two frames is, indicating larger movements in the display contents.

The result judging unit 38 specifies a section for which moving image data for special reproduction is to be generated, by comparing the result of calculation obtained by the difference calculating unit 36 with a predetermined threshold value.

Based on the result by the result judging unit 38, the moving image data for special reproduction extracting unit 40 extracts applicable moving image data for special reproduction by cutting out the specified section of original moving image data present in the storage 56.

The identification information generator 50 inputs moving image data for normal reproduction or its position specifying information from the moving image data for normal reproduction extracting unit 44 and inputs moving image data for special reproduction or its position specifying information from the moving image data for special reproduction extracting unit 40, respectively. And the identification information generator 50 associates the moving image data for normal reproduction and the moving image data for special reproduction with each other. Moreover, the identification information generating unit 50 generates identification information by adding other information to be described later to the results of the above association.

A transmission data generator 52 acquires moving image data for normal reproduction from the moving image data for normal reproduction extracting unit 44, acquires moving image data for special reproduction from the moving image data for special reproduction extracting unit 40, and acquires identification information from the identification information generator 50 and forms a data stream to be transmitted from the normal reproduction extracting unit 44, the moving image data for special reproduction extracting unit 40 and the identification information generator 50. Although the concrete features of a data stream will be discussed later, moving image data for normal reproduction and moving image data for special reproduction are associated with each other by identification information, so that it is also possible to place these two kinds of data separately within a data stream.

The transmission unit 54 transmits a data stream generated by the transmission data generator 52 by a specified method. Moreover, a transmission buffer (not shown) may be added to equalize the transmission capacities of data streams.

Figure 5:
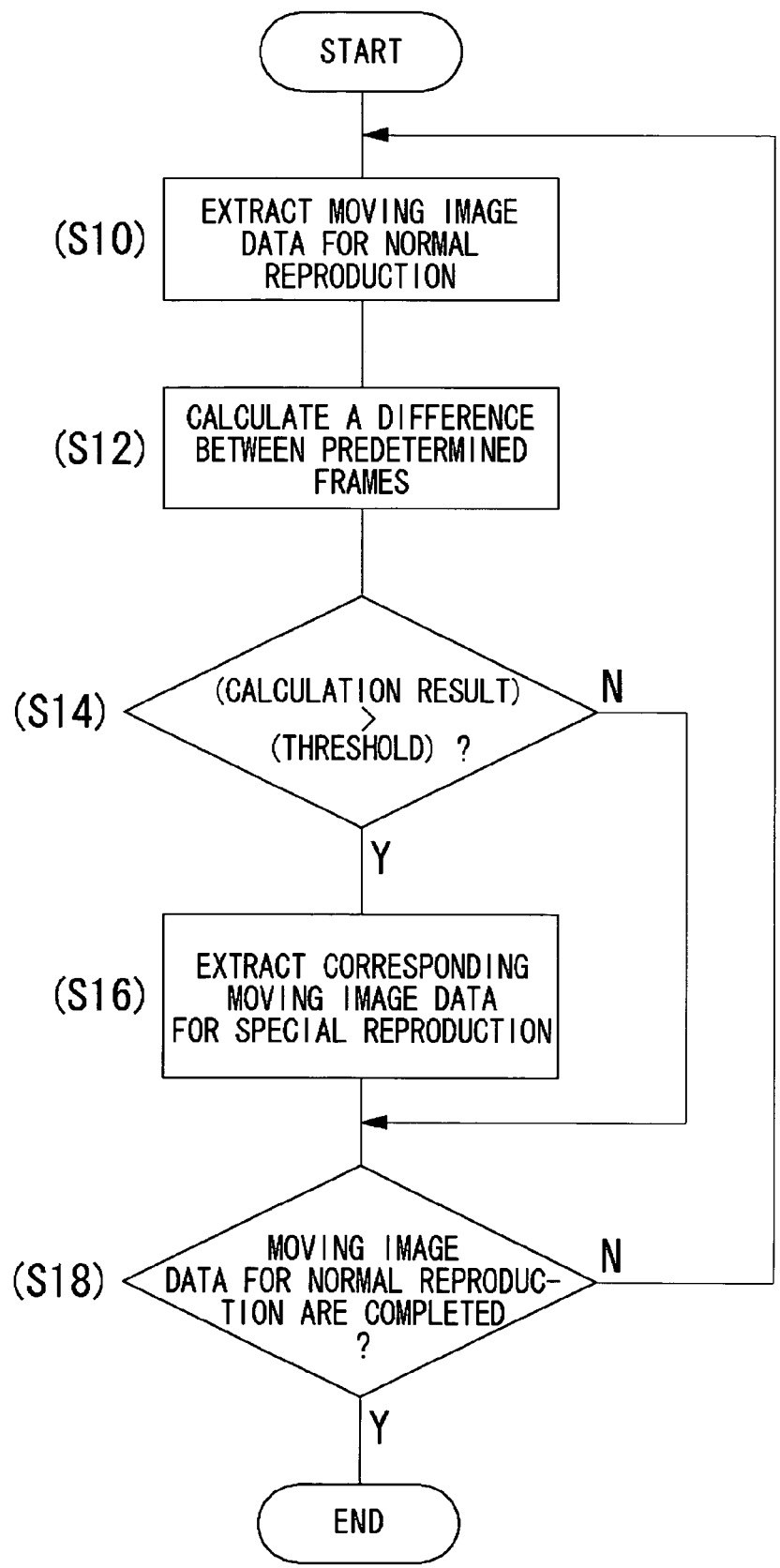
FIG. 5 shows a procedure for generating moving image data for normal reproduction and moving image data for special reproduction according to the image editing apparatus shown in FIG. 4.

FIG. 5 shows a procedure for extracting moving image data for normal reproduction and moving image data for special reproduction from original moving image data. The moving image data for normal reproduction extracting unit 44 extracts, through a thinning-out processing, moving image data for normal reproduction from the original moving image data stored in the storage 56 (S10). The difference calculating unit 36 calculates the difference between predetermined moving image data for normal reproduction data frames (S12). The result judging unit 38 compares the result of calculation with a predetermined threshold value, and if the result of calculation is larger (Y of S14), extracts, by a cutting-out processing, moving image data for special reproduction from original moving image data stored in the storage 56 (S16). The above operation is continued until moving image data for normal reproduction come to an end (N of S18).

FIGS. 6A to 6E show frames in the process of generating moving image data for normal reproduction and moving image data for special reproduction. FIG. 6A shows a frame structure of original moving image data inputted through the input unit 30 and stored in the storage 56. The frames are represented by squares and the numerals in them show a sequence of the frames of the original moving image data. The time interval between these frames is T2, which is equivalent to a high-speed frame rate. T1, which is equivalent to a standard frame rate, is set at four times T2. FIG. 6B, shown in oblique lines, represents moving image data for normal reproduction selected at intervals of T1 from the original moving image data frames by the moving image data for normal reproduction extracting unit 44. S1, S2 and the like in the squares show a sequence of the frames of the moving image data for normal reproduction. They correspond one-to-one with the frames of the original moving image data. For example, S1 of FIG. 6B corresponds to 1 of FIG. 6A, and S2 of FIG. 6B corresponds to 5 of FIG. 6A.

The difference calculating unit 36 calculates a difference in display contents between adjacent frames, such as between S1 and S2 or S2 and S3. FIG. 7A and FIG. 7B show an example of difference calculation. FIG. 7B shows a moving image data frame for normal reproduction which is disposed next to one of FIG. 7A. Here, differences between the pixel values for the same coordinates are calculated. In FIGS. 7A and 7B, coordinates (x1, y1) are the same as coordinates (x1', y1'), and coordinates (x2, y2) are the same as coordinates (x2', y2'). In this case, the difference in the pixel values between coordinates (x2, y1) and coordinates (x1', y1') is small, whereas the difference in the pixel values between coordinates (x2, y2) and coordinates (x2', y2') is large. These differences are accumulated over the whole screen so as to become the results of calculation. In FIG. 6B, the results of calculation of differences between adjacent moving image data frames for normal reproduction are exemplified by numerical values from "a" to "d".

The result judging unit 38 compares the results of difference calculation with a predetermined threshold value. Here, it is assumed that the numerical values "a" and "d," which are each a result of difference calculation, are smaller than the threshold value and the numerical values "b" and "c" are larger than the threshold value. Accordingly, as shown in FIG. 6C, moving image data for special reproduction are not required for the section S1 to S2 and the section S4 to S5 of moving image data frames for normal reproduction, whereas moving image data for special reproduction are required for the section S2 to S3 and the section S3 to S4 thereof.

FIG. 6D shows the moving image data frames for special reproduction selected from the original moving image data present in the storage 56, as shown in FIG. 6A, by the moving image data for special reproduction extracting unit 40 based on the result obtained from the result judging unit 38. The symbols in the squares show a sequence of the frames of the moving image data for special reproduction. FIG. 6E shows information on the relationship between the moving image data frames for normal reproduction and the moving image data frames for special reproduction, that is, part of the identification information. Each of the information includes a number showing a place in the sequence of frames for moving image data for normal reproduction and a leading number showing a place in the sequence of frames for moving image data for special reproduction corresponding to the former. The examples are "S2-F1" and "S3-F5". Where there are no corresponding frames of moving image data for special reproduction, "None" is written.

Figure 8A:
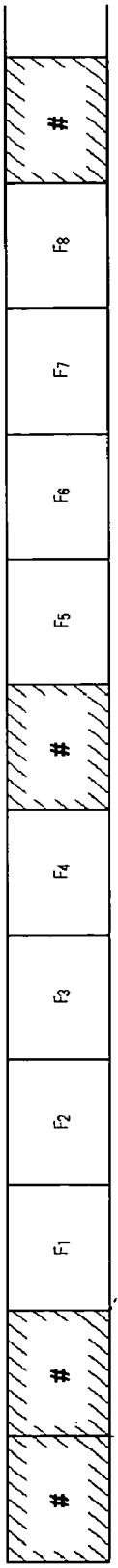
FIGS. 8A to FIG. 8D show data streams according to the image editing apparatus shown in FIG. 4.
Figure 8B:
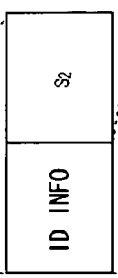
Figure 8C:

FIG. 8A to FIG. 8D show data streams formed of moving image data for normal reproduction, moving image data for special reproduction and identification information generated by the transmission data generator 52 in the above-described process. FIG. 8C is an example of identification information. The identification information is composed of a flag, a frame rate, a size, a position and a pointer. The flag shows the presence or absence of moving image data for special reproduction corresponding to the particular moving image data frame for normal reproduction. The frame rate shows the value of a high-speed frame rate. The size shows the size of the area that moving image data frames for special reproduction occupy in a screen of moving image data frames for normal reproduction. The position shows the position of the area that moving image data frames for special reproduction occupy in the screen of the moving image data frames for normal reproduction. And the pointer shows the position where the corresponding moving image data for special reproduction exists. The pointer, for example, is the position of moving image data for special reproduction in a data stream, but is not limited thereto. The pointer may also be a correspondence relationship between a moving image data frame for normal reproduction and moving image data frames for special reproduction as shown in FIG. 6E. Any format may be used therefor so long as moving image data frames for special reproduction corresponding to a moving image data frame for normal reproduction can be identified. The size and position are set by assuming a case where moving image data frames for special reproduction are placed for a partial area within a moving image data frame for standard reproduction. The details will be described later.

FIG. 8A shows a data stream constituted by moving image data packets for normal reproduction, each of which comprises identification information and a moving image data frame for normal reproduction, and moving image data frames for special reproduction. Here, the moving image data packets for normal reproduction and the moving image data frames for special reproduction are arranged, as an example, in the same sequence as shown in FIGS. 6B and 6D. The arrangement, however, does not have to be a time series since the identification information contained in each moving image data packet for normal reproduction carries information on corresponding moving image data frames for special reproduction. For example, moving image data packets for normal reproduction may be arranged preferentially and then moving image data frames for special reproduction may be arranged in places where there are no moving image data packets for normal reproduction.

This arrangement, which does not allow moving image data frames for normal reproduction to wedge into moving image data frames for special reproduction, can respond better to cases where moving image data for normal reproduction call for a real-time reproduction. Further, even conventional image reproducing apparatuses, which do not assume the presence of moving image data for special reproduction, may reproduce moving image data for normal reproduction without any problem, thus realizing upper compatibility. Moreover, the association of moving image data for normal reproduction and moving image data for special reproduction with each other contributes to the smoothing of the transmission band by placing moving image data for special reproduction in arbitrary positions. FIG. 8B shows a moving image data packet for normal reproduction, which is comprised of identification information and a moving image data frame for normal reproduction.

Figure 8D:
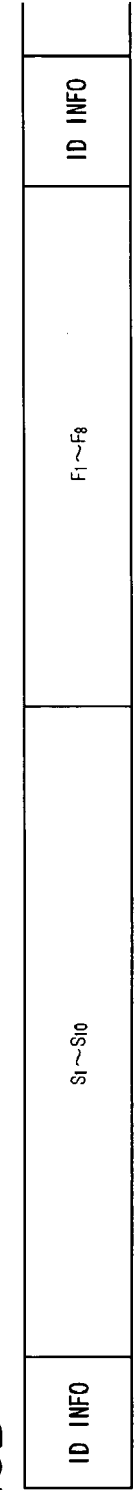

FIG. 8D, on the other hand, exemplifies a data stream different from FIG. 8A, in which a single unit of identification information is not added to a single moving image data frame for normal reproduction but to a plurality of moving image data frames for normal reproduction. The identification information in this case is changed accordingly. This data arrangement improves the utilization factor of a data stream. It is to be noted that a header file describing control information on a whole data stream and the like may also be placed at the top of the above-described data stream.

Figure 9:
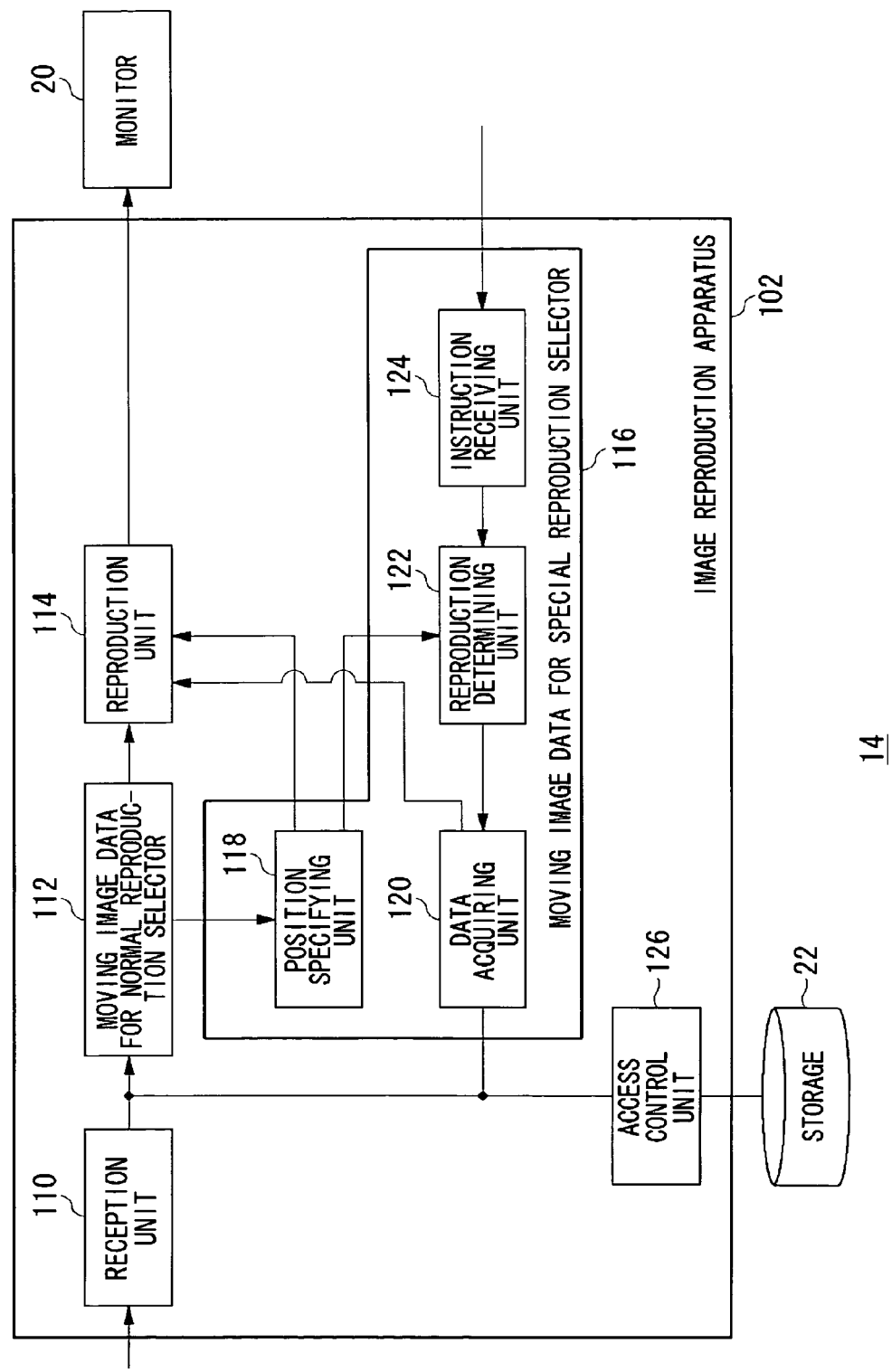
FIG. 9 shows a structure of an image reproducing apparatus according to a first embodiment of the present invention.

FIG. 9 shows a structure of an image reproducing apparatus 102 shown in FIG. 1. A PC 14 for reproduction includes an image reproducing apparatus 102, a storage 22 and a monitor 20. The image reproducing apparatus 102 includes a reception unit 110, an access control unit 126, a moving image data for normal reproduction selector 112, a moving image data for special reproduction selector 116, and a reproduction unit 114. Further, the moving image data for special reproduction selector 116 includes a position specifying unit 118, a data acquiring unit 120, a reproduction determining unit 122, and an instruction receiving unit 124.

The reception unit 110 receives a data stream as shown in FIGS. 8A to 8D. It is assumed that the method of reception complies with the transmission method by the transmission unit 54 in FIG. 4.

The access control unit 126 carries out the processing of writing predetermined data to the storage 22 or reading predetermined data from the storage 22. The access control unit 26 may further perform such control processing as control over the positions of data stored in the storage 22 or updating of predetermined files resulting from the control.

The storage 22, which is constituted by a storage medium such as a hard disk, stores received data streams. The storage 22 may be provided within the image reproducing apparatus 102.

The moving image data for normal reproduction selector 112 selects moving image data for normal reproduction from the storage 22 via the access control unit 126. The selector 112 acquires identification information together with the moving image data for normal reproduction.

The position specifying unit 118 specifies the positions of moving image data for special reproduction in the storage 22 based on the identification information inputted from the moving image data for normal reproduction selector 112. Furthermore, the position specifying unit 118 retains the information during the reproduction of moving image data for normal reproduction and outputs the information when the moving image data for special reproduction are to be reproduced in slow motion.

The reproduction unit 114 reproduces moving image data for normal reproduction at a standard frame rate. Moreover, the reproduction unit 114 carries out the slow-motion reproduction of moving image data for special reproduction at a standard frame rate. According to the first embodiment, the ratio of the high-speed frame rate to the standard frame rate is 4:1, so that a slow-motion reproduction is done at a ¼ speed. When a slow-motion reproduction of moving image data for special reproduction is to be done in accordance with user instructions, a display is also made in a way recognizable to the user that indicates the sections where moving image data for special reproduction are placed in moving image data for normal reproduction. The method for the display and indication thereof to the user will be described later.

The instruction receiving unit 124 receives the user instruction, to the effect that the moving image data for special reproduction be reproduced in slow motion, which is directed at a section where the moving image data for special reproduction are placed in moving image data for normal reproduction. The method for inputting instructions from the user will be described later. This instruction receiving unit 124 is connected to an external input device (not shown), such as a keyboard or a mouse.

The reproduction determining unit 122 determines moving image data frames for special reproduction to be subjected to a slow-motion reproduction. An instruction about the section where the moving image data for special reproduction are to be reproduced in slow motion are inputted from the instruction receiving unit 124, and the positions of the moving image data for special reproduction in the storage 22 are inputted from the position specifying unit 118. Based on these two items of information, the reproduction determining unit 122 identifies the positions of the moving image data for special reproduction to be subjected to a slow-motion reproduction in the storage 22, and outputs an instruction to extract the moving image data for special reproduction from there.

The data acquiring unit 120 inputs the identified positions from the reproduction determining unit 122 and acquires the moving image data for special reproduction to be reproduced in slow motion from the storage 22 via the access control unit 126. Further, the data acquiring unit 120 outputs the thus acquired data to the reproduction unit 114, where they are reproduced in slow motion. In the same manner as with moving image data for normal reproduction, the moving image data for special reproduction are reproduced in slow motion at a standard frame rate by the reproduction unit 114.

FIG. 10 shows a data structure in a logical address space of storage contents in the storage 22 of the image reproducing apparatus 102 shown in FIG. 9. The logical address space of the storage 22 comprises logically a plurality of subspaces, and each of the subspaces has a region to store a single moving image data frame for normal reproduction or the like. Here, each subspace is represented by a single line, and a line number is so defined as to correspond to the address of a subspace in the logical address space. Namely, the line numbers correspond to the positions where respective data exist. As for the storage area of moving image data frames for normal reproduction, appropriate identification information is placed at the top of the line, which is followed by a moving image data frame for normal reproduction. Although the structure of identification information here is basically the same as one shown in FIG. 8C, the pointer indicating the position of moving image data for special reproduction contained in the identification information is corrected or added to the line number storing the appropriate moving image data for special reproduction. This correction is done by the access control unit 126. Where there is no identification information for each moving image data frame for normal reproduction as shown in FIG. 8D, a moving image data frame for normal reproduction may be placed from the top of the line without identification information. The similar rule applies to moving image data for special reproduction as well.

Figure 11:
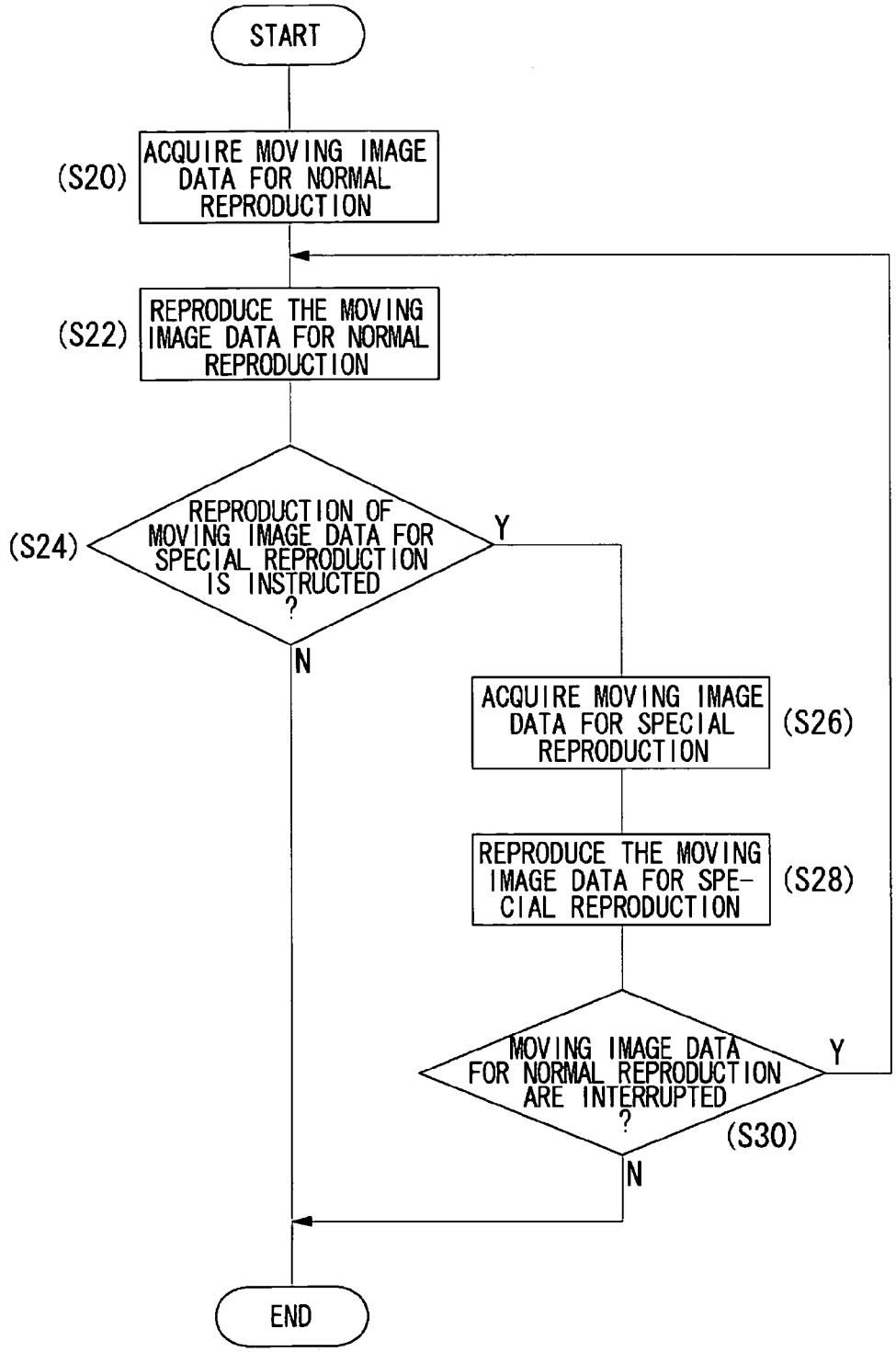
FIG. 11 shows a procedure for reproducing moving image data for normal reproduction and moving image data for special reproduction according to the image reproducing apparatus shown in FIG. 9.

FIG. 11 shows a procedure for reproducing moving image data for normal reproduction and moving image data for special reproduction at the image reproducing apparatus shown in FIG. 9. The moving image data for normal reproduction selector 112 shown in FIG. 9 acquires moving image data for normal reproduction from the storage 22 (S20). At this time, the selector 112 also acquires identification information. The reproduction unit 114 reproduces the acquired moving image data for normal reproduction at a standard frame rate (S22) and causes them to be displayed by the monitor 20. During or after the reproduction of the moving image data for normal reproduction, the user instructs the instruction receiving unit 124 to carry out a slow-motion reproduction of moving image data for special reproduction, using a predetermined interface (Y of S24).

Based on the user instruction and the position of moving image data for special reproduction identified from the identification information, the reproduction determining unit 122 and the data acquiring unit 120 acquire moving image data for special reproduction from the storage 22 (S26). The moving image data for special reproduction thus acquired are reproduced in slow motion at a standard frame rate by the reproduction unit 114 (S28). The reproduction is displayed again by the monitor 20. If the slow-motion reproduction of the moving image data for special reproduction is carried out by interrupting the reproduction of moving image data for normal reproduction (Y of S30), the moving image data for normal reproduction will be reproduced from the point of interruption or from the top (S22). And operation will come to an end if the slow-motion reproduction of the moving image data for special reproduction is carried out after the end of moving image data for normal reproduction (N of S30).

Figure 12:
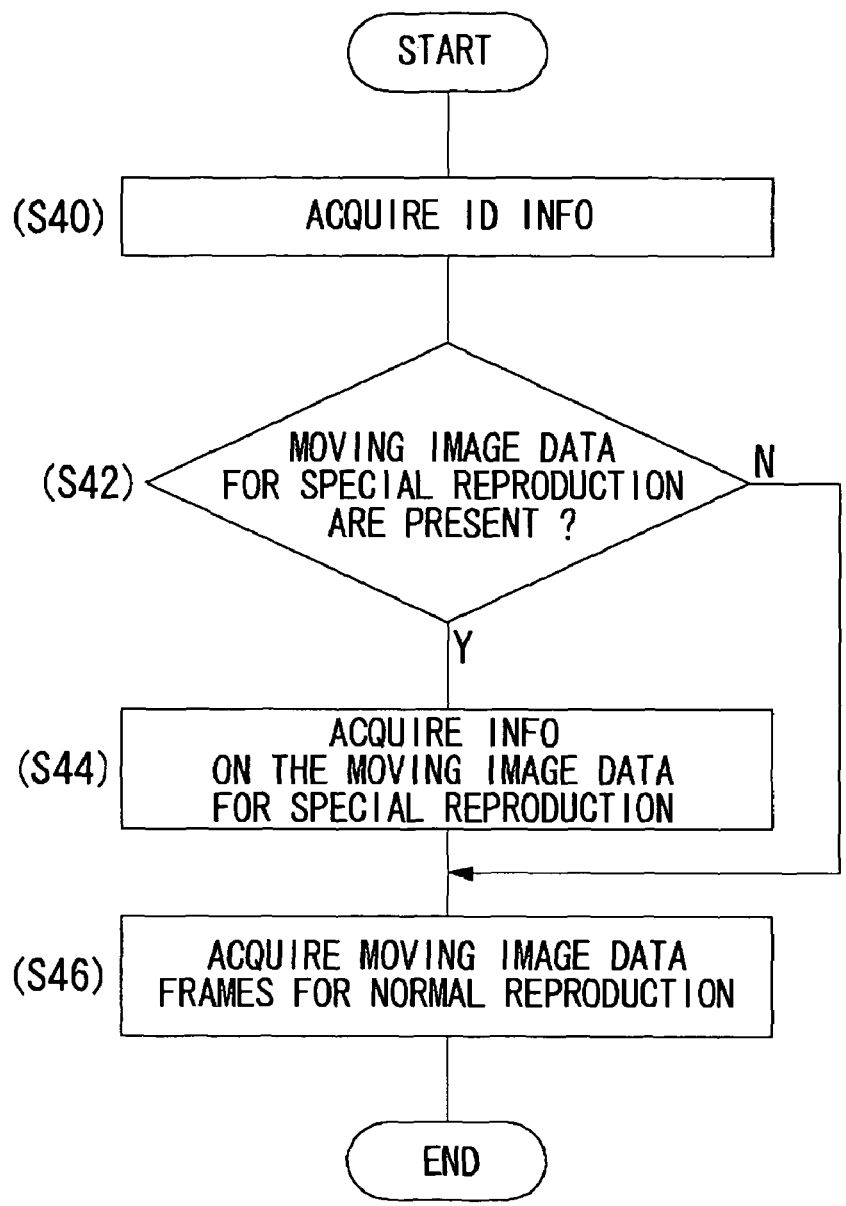
FIG. 12 shows a procedure for acquiring moving image data frames for normal reproduction and identification information according to the image reproducing apparatus shown in FIG. 9.
Figure 15A:
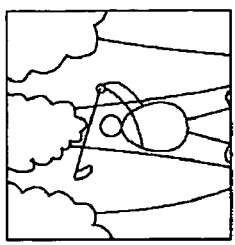
FIGS. 15A to 15J show still another mode of a display screen to reproduce moving image data for normal reproduction according to the image reproducing apparatus shown in FIG. 9.
Figure 15B:
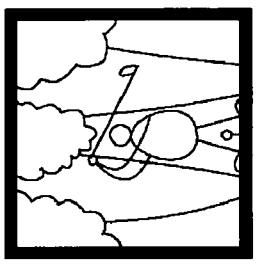
Figure 15C:
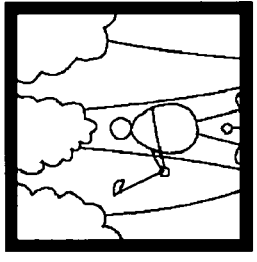
Figure 15D:
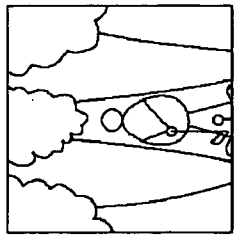
Figure 15E:
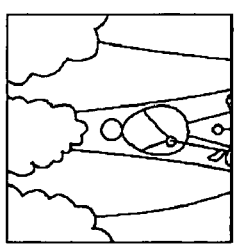
Figure 15F:
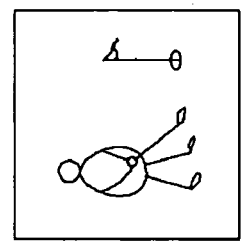
Figure 15G:
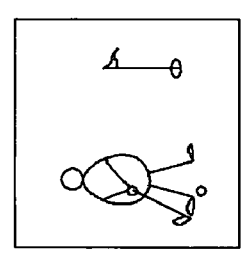
Figure 15H:
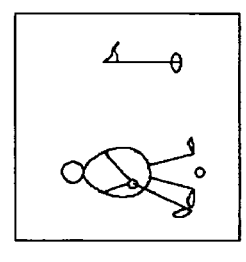
Figure 15I:
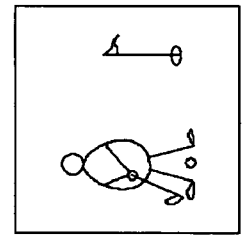
Figure 15J:
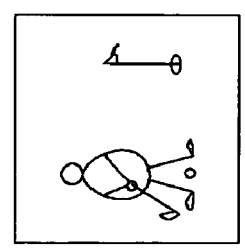

FIG. 12 shows a procedure for acquiring moving image data frames for normal reproduction and identification information. The moving image data for normal reproduction selector 112 shown in FIG. 9 acquires identification information on moving image data frames for normal reproduction from the storage 22 (S40). If the flag of the acquired identification information, as shown in FIG. 8C, indicates the presence of moving image data for special reproduction corresponding to moving image data frame for normal reproduction (Y of S42), the position specifying unit 118 further acquires the position of the moving image data for special reproduction in the storage 22 (S44). This information is retained by the position specifying unit 118. The moving image data for normal reproduction selector 112 further acquires moving image data frames for normal reproduction (S46). On the other hand, if there are no moving image data for special reproduction corresponding to moving image data frames for normal reproduction (N of S42), the moving image data frames for normal reproduction, as they are, are acquired (S46). Note that the moving image data for normal reproduction may be acquired (S46) before identification information is acquired (S40).

A slow-motion reproduction of moving image data for special reproduction is carried out at the instruction from the user. However, moving image data for special reproduction according to the first embodiment are present only in predetermined sections of moving image data for normal reproduction. Accordingly, it is necessary that the user be notified, during the reproduction of moving image data for normal reproduction or at other times, of the sections where moving image data for special reproduction are present. This is done by the reproduction unit 114 shown in FIG. 9. FIGS. 13 to 15 show three types of user interface that are displayed by the monitor 20 as shown in FIG. 9.

FIG. 13A shows a case where there are no moving image data frames for special reproduction corresponding to a moving image data frame for normal reproduction whereas FIG. 13B shows a case where there are moving image data frames for special reproduction corresponding thereto. When moving image data frames for special reproduction are present, characters "SLOW" are displayed on the screen displaying the moving image data frame for normal reproduction. The moving image data for special reproduction are selected when the user sends a signal to the instruction receiving unit 124 as shown in FIG. 9 by a click of a mouse or the like after recognizing the characters "SLOW" during the reproduction of moving image data for normal reproduction.

FIG. 14, in the same manner as FIG. 13B, shows a display of predetermined characters on the screen when corresponding moving image data for special reproduction are present. Different from FIG. 13B, however, the sections where all the moving image data for special reproduction exist are displayed here as "SLOW 0:30" and "SLOW 0:50" irrespective of the moving image data frame for normal reproduction now being displayed. This indicates that when a reproduction is started from the top of moving image data for normal reproduction, there are moving image data for special reproduction present at the points of 30 minutes and 50 minutes, respectively, from the start of the reproduction. These moving image data for special reproduction are selected when the user sends a signal to the instruction receiving unit 124 as shown in FIG. 9 by a click of a mouse on this display.

FIGS. 15A-15J is each a thumbnail display of moving image data frames for normal reproduction. The moving image data frames for normal reproduction in which moving image data for special reproduction are present are outlined by the thick line. In FIGS. 15A-15J, there are moving image data for special reproduction corresponding to the moving image data frames C and D (shown as FIG. 15C and FIG. 15D) for normal reproduction. The moving image data for special reproduction are selected when the user sends a signal to the instruction receiving unit 124 as shown in FIG. 9 by a click of a mouse on this display. It is to be noted that only the moving image data frames for normal reproduction in which moving image data for special reproduction are present may be displayed instead of displaying all the moving image data frames for normal reproduction as in FIGS. 15A-15J. In this manner, the display space may be made smaller. On the other hand, the display of all the moving image data frames for normal reproduction as in FIGS. 15A-15J can clearly show the positions of moving image data for special reproduction whose reproduction is desired by the user within the whole moving image data for normal reproduction.

Figure 16A:
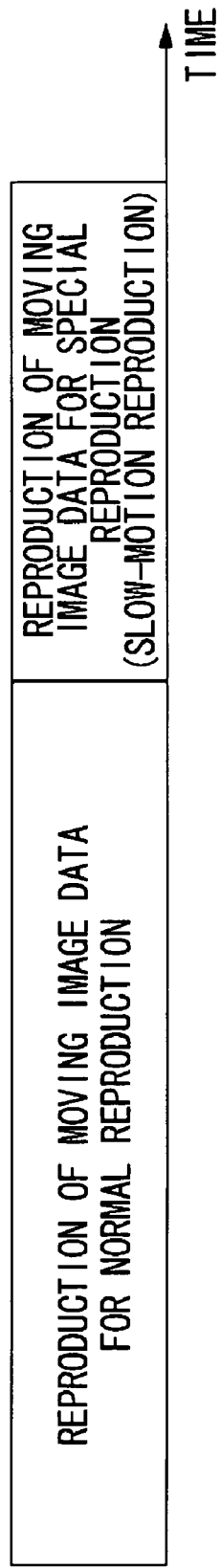
FIGS. 16A and 16B show time relationship between the reproduction of moving image data for normal reproduction and the reproduction of moving image data for special reproduction according to the image reproducing apparatus shown in FIG. 9.
Figure 16B:
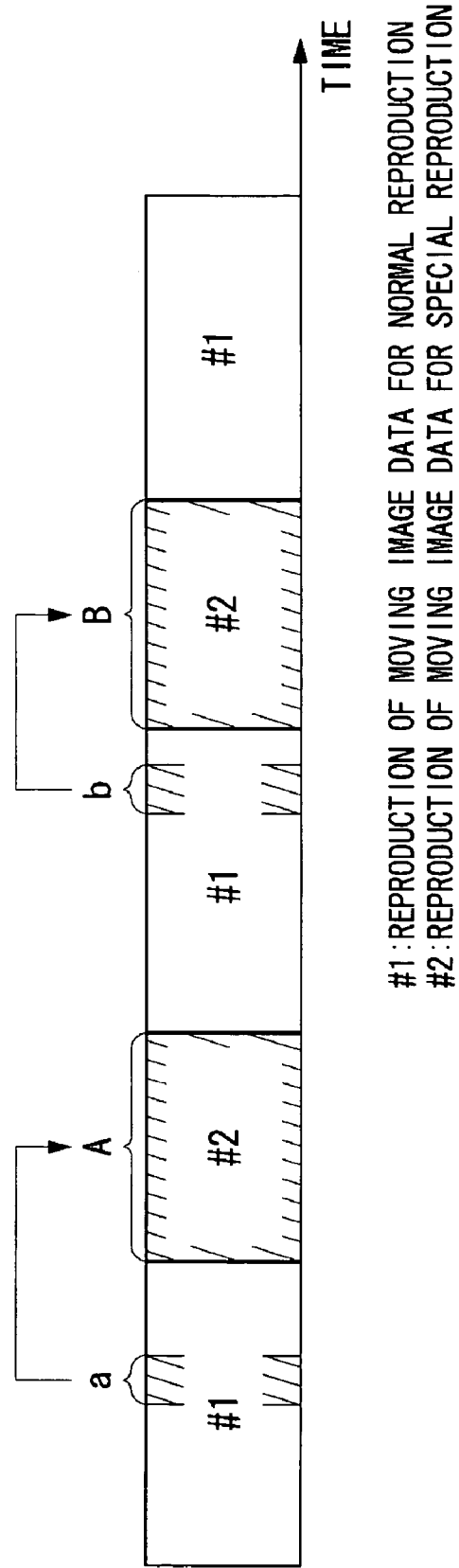

FIGS. 16A and 16B show time relationship between the reproduction of moving image data for normal reproduction and the reproduction of moving image data for special reproduction. FIG. 16A represents a case where a slow-motion reproduction is carried out following the end of the reproduction of moving image data for normal reproduction. FIG. 16B, on the other hand, represents a case where a slow-motion reproduction is carried out by interrupting the reproduction of moving image data for normal reproduction and after the end of the slow-motion reproduction the reproduction of the moving image data for normal reproduction is resumed. In FIG. 16B, the section "a" of the reproduction of moving image data for normal reproduction is subjected to a slow-motion reproduction in the section A.

According to the present embodiment, moving image data for special reproduction having a high-speed frame rate are generated in annexation to moving image data for normal reproduction having a standard frame rate, and since the positions of these data are associated with each other by identification information, the moving image data for special reproduction can be placed in arbitrary positions in the data stream. By transmitting moving image data for normal reproduction preferentially, this arrangement can handle a real-time reproduction of moving image data for normal reproduction easily. Moreover, by reproducing the moving image data for special reproduction, having been generated at a high-speed frame rate, at a frame rate lower than the high-speed frame rate, this arrangement can realize a smooth slow-motion reproduction even when there are large movements in display contents between frames. Furthermore, clearly indicated are the sections where moving image data for special reproduction are placed within the moving image data for normal reproduction, so that the user can easily recognize such sections. Furthermore, this arrangement requires only a simple interface because the user is supposed only to indicate the section for which he/she desires a slow-motion reproduction.

Second Embodiment

According to a second embodiment of the present invention, an image editing apparatus sends moving image data for special reproduction and moving image data for normal reproduction to separate storages. An image reproducing apparatus extracts appropriate data from the separate storages utilizing the identification information.

The second embodiment relates to an image editing apparatus 100 of a type as shown in FIG. 2. This image editing apparatus 100 may be effectively structured as shown in FIG. 4. However, with the image editing apparatus 100 according to the second embodiment, storage of moving image data for normal reproduction and the like is shared by the first storage 24 of the PC 14 for reproduction and the second storage 26 of the server 18, so that the functions of the transmission data generator 52 and the transmission unit 54 differ from those of the first embodiment.

The transmission data generator 52 acquires and inputs moving image data for normal reproduction from the moving image data for normal reproduction extracting unit 44, and identification information indicating the association between the moving image data for normal reproduction and the moving image data for special reproduction from the identification information generator 50 and generates a data stream to be discussed later. Although moving image data for special reproduction are also inputted to the transmission data generator 52, the moving image data for special reproduction are not incorporated into the data stream and are processed independently.

The transmission unit 54 transmits the data stream and the moving image data for special reproduction to separate access destinations. In the case of FIG. 2, the data stream is transmitted to the first storage 24 of the PC 14 for reproduction, and the moving image data for special reproduction are transmitted to the second storage 26 of the server 18.

FIGS. 17A to 17D show data structures of moving image data for normal reproduction to be generated by the transmission data generator 52, a data stream to be formed based on identification information and moving image data for special reproduction.

FIG. 17A shows a data stream composed of moving image data packets for normal reproduction only, which are each comprised of identification information and a moving image data frame for normal reproduction, unlike the one shown in FIG. 8A. It is to be understood here that the structure of a data stream is not limited to this, but may for instance be a data structure in which moving image data frames for normal reproduction are arranged successively as shown in FIG. 8D. And a predetermined header file may be added to the top of this data stream, and a destination of this data stream may be written in the header file. In the example of FIG. 2, the destination is the IP address of the PC 14 for reproduction.

FIG. 17B is equal to FIG. 8B. FIG. 17C differs from FIG. 8C only by the addition of an address. The address is an address of a medium in which moving image data for special reproduction are stored. In the example of FIG. 2, it is the IP address of the server 18.

FIG. 17D shows a data structure comprised of moving image data frames for special reproduction only. This data structure, which has a header file carrying a destination address or the like, is capable of carrying out a transmission processing. In the case of FIG. 2, the destination address is the IP address of the server 18.

The second embodiment relates to an image reproducing apparatus 102 of a type as shown in FIG. 2. This image reproducing apparatus 102 may be effectively structured as shown in FIG. 9. The image reproducing apparatus 102 according to the second embodiment, however, is capable of reproducing both the moving image data for normal reproduction and moving image data for special reproduction even when they are stored in separate storage mediums, so that the functions of the data acquiring unit 120 and the reception unit 110 differ from those of the first embodiment.

The storage 22, which is equivalent to the first storage 24 of FIG. 2, stores moving image data frames for normal reproduction and identification information contained in a data stream shown in FIGS. 17A and 17B. Unlike the storage 22 of FIG. 9, however, the storage 22 does not store moving image data frames for special reproduction.

The data acquiring unit 120 receives the input of the positions of moving image data for special reproduction to be reproduced in slow motion and the address of the storage from the reproduction determining unit 122.

The reception unit 110 accesses the storage at the address specified by the data acquiring unit 120 in order to acquire the predetermined moving image data for special reproduction. The moving image data for special reproduction thus acquired are again inputted to the reception unit 110. And these moving image data for special reproduction are again inputted to the data acquiring unit 120. The data acquiring unit 120 outputs these moving image data for special reproduction to the reproduction unit 114 for a slow-motion reproduction.

Even though the moving image data for normal reproduction and the moving image data for special reproduction are stored separately, the data acquiring unit 120 changes access destinations accordingly. At the stage of reproduction by the reproduction unit 114, therefore, the processing is carried out as if there were no difference in storage medium in which moving image data for special reproduction are stored.

The data structure of storage contents in the storage 22 is equivalent to the remaining part of FIG. 10 after exclusion of moving image data for special reproduction. It is to be noted that although the structure of identification information is basically the same as one shown in FIG. 17C, the pointer indicating the positions of moving image data for special reproduction contained in the identification information is corrected or added to the appropriate position in the second storage 26 where the moving image data for special reproduction are stored. This correction may be made at the access control unit 126 according to the instruction from the server 18 that includes the second storage 26. On the other hand, the data structure in the second storage 26 shown in FIG. 2 consists of moving image data frames for special reproduction only.

By implementing a structure according to the second embodiment, the image editing apparatus transmits the moving image data for normal reproduction and the moving image data for special reproduction to their respective storage mediums and the image reproducing apparatus reproduces them, so that the storage capacity of the PC or the like including the image reproducing apparatus can be reduced.

Third Embodiment

According to a third embodiment of the present invention, moving image data for special reproduction are reproduced in slow motion by handling them as data equivalent to a partial area in the image frame of moving image data for normal reproduction. "Data equivalent to a partial area" means, for instance, an area with large movements, such as an image area including a person in action or the like, in moving image data for normal reproduction. The third embodiment assumes the use of an image editing apparatus 100 and an image reproducing apparatus 102 shown in FIG. 1.

Figure 18:
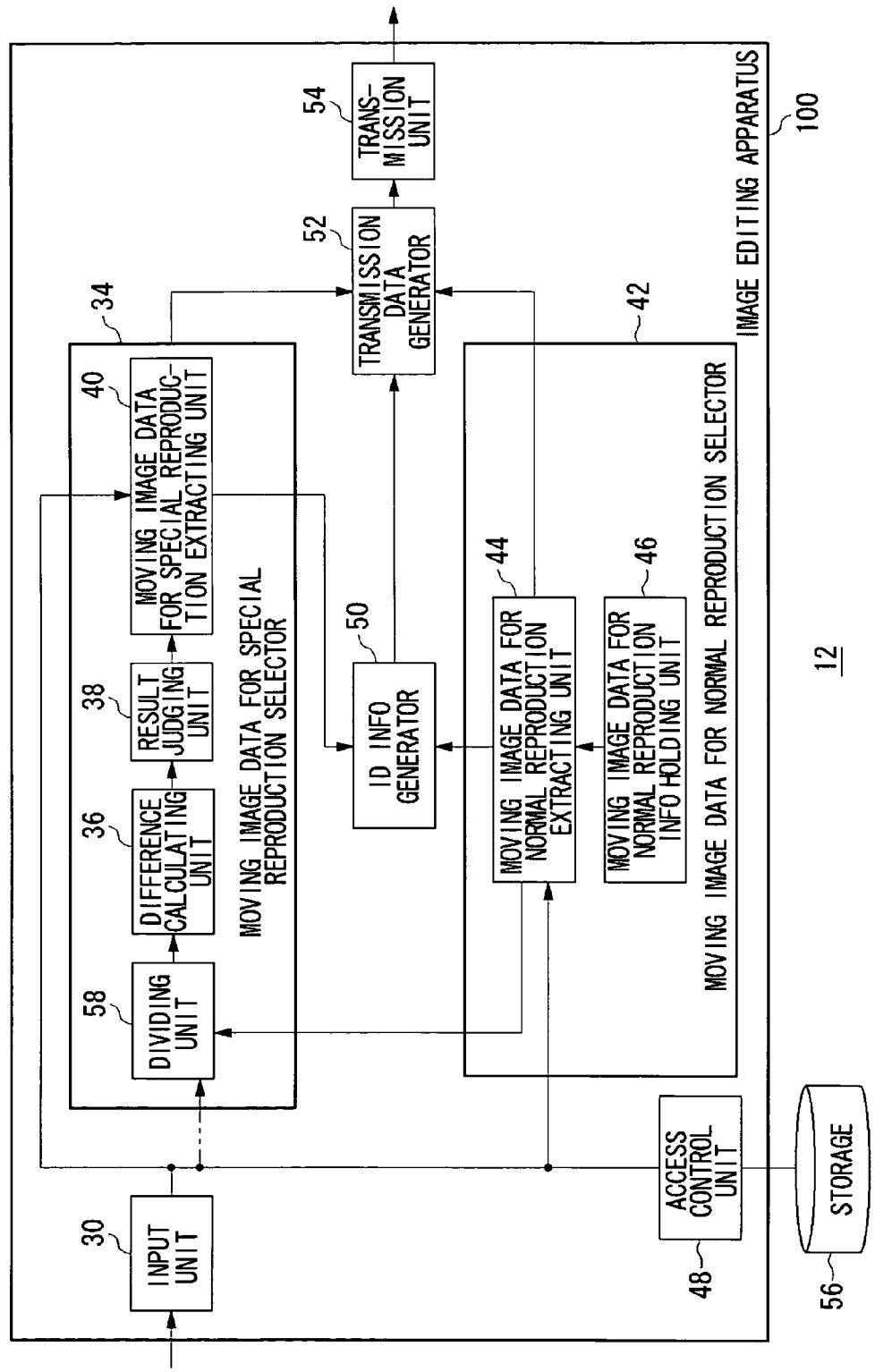
FIG. 18 shows a structure of an image editing apparatus according to a third embodiment of the present invention.

FIG. 18 shows a structure of an image editing apparatus 100. The structure of the image editing apparatus 100 is nearly the same as that of the image editing apparatus 100 shown in FIG. 4. It differs from the latter in that a dividing unit 58 is added and that a difference calculating unit 36, a result judging unit 38, a moving image data for special reproduction extracting unit 40 and an identification information generator 50 have different functions.

In order to prepare moving image data for special reproduction in partial areas on the display screen of moving image data for normal reproduction, the dividing unit 58 divides the screen into image areas that will become display screen later. Although the division scheme may be arbitrary, the screen is divided into equal parts, such as 16 equal parts.

The difference calculating unit 36 calculates the difference for each of divided parts in the same way as in the first embodiment. The result judging unit 38 determines divided parts for which moving image data for special reproduction are to be generated within the display screen of moving image data for normal reproduction, based on the results of calculation by the difference calculating unit 36. The "area" for which moving image data for special reproduction are to be generated is determined by interconnecting the thus decided divided parts within the screen, and the "section" is determined by connecting them in the direction of time. The terms "area" and "section" hereinafter are all used in these senses.

The moving image data for special reproduction extracting unit 40 extracts, from the original moving image data in the storage 56, moving image data for special reproduction to appropriate the area and section determined by the result determining unit 38.

The identification information generator 50 generates identification information by associating the moving image data frames for special reproduction inputted from the moving image data for special reproduction extracting unit 40 with the moving image data frames for normal reproduction inputted from the moving image data for normal reproduction extracting unit 44. Although the data structure of the identification information may be the same as in FIG. 8C, the size and position of the area where the moving image data for special reproduction are to be placed are specified for the size and position thereof.

Figure 19A:
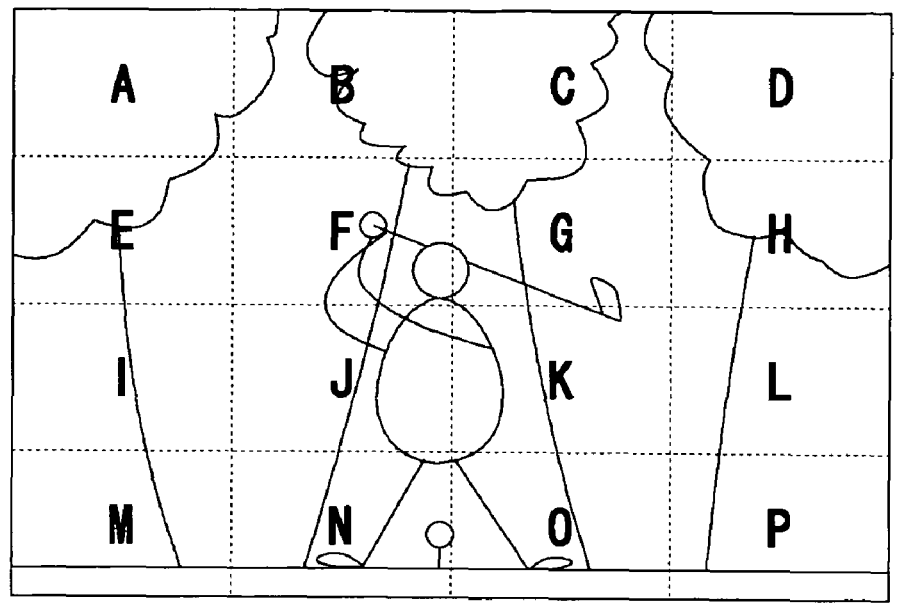
FIGS. 19A and 19B show display screens divided into sixteen parts according to the image editing apparatus shown in FIG. 18.
Figure 19B:
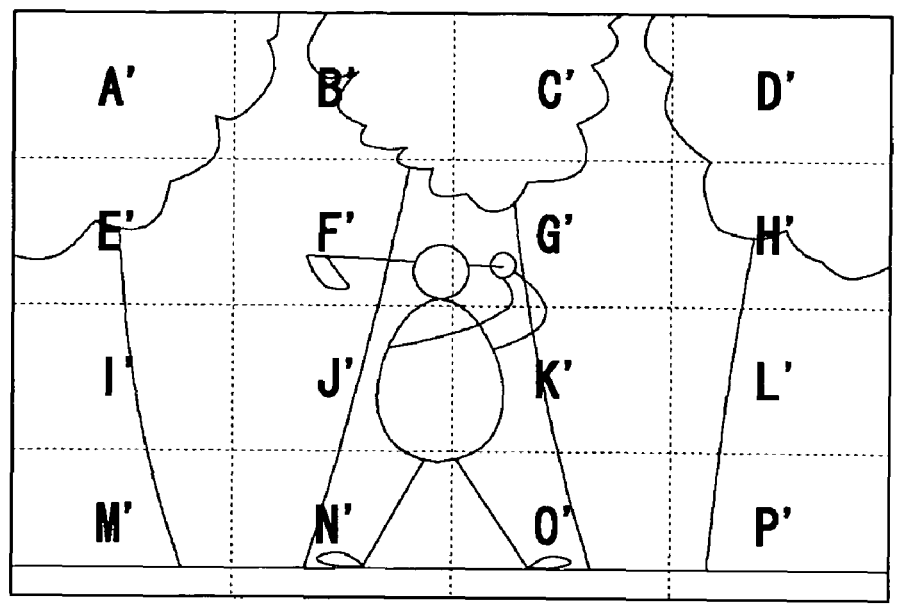

FIGS. 19A and 19B show display screens divided into sixteen parts by the dividing unit 58. The division is shown in dotted lines and alphabetical letters A to P, which are, of course, for the purpose of explanation and do not actually appear on the actual screen. FIG. 19B shows a display screen, divided the same way as in FIG. 19A, which shows the moving image data frame for normal reproduction to appear following one in FIG. 19A. Between the two displays, there is correspondence, such as A to A' and B to B', and the difference calculating unit 36 performs calculation of differences between them.

Figure 20:
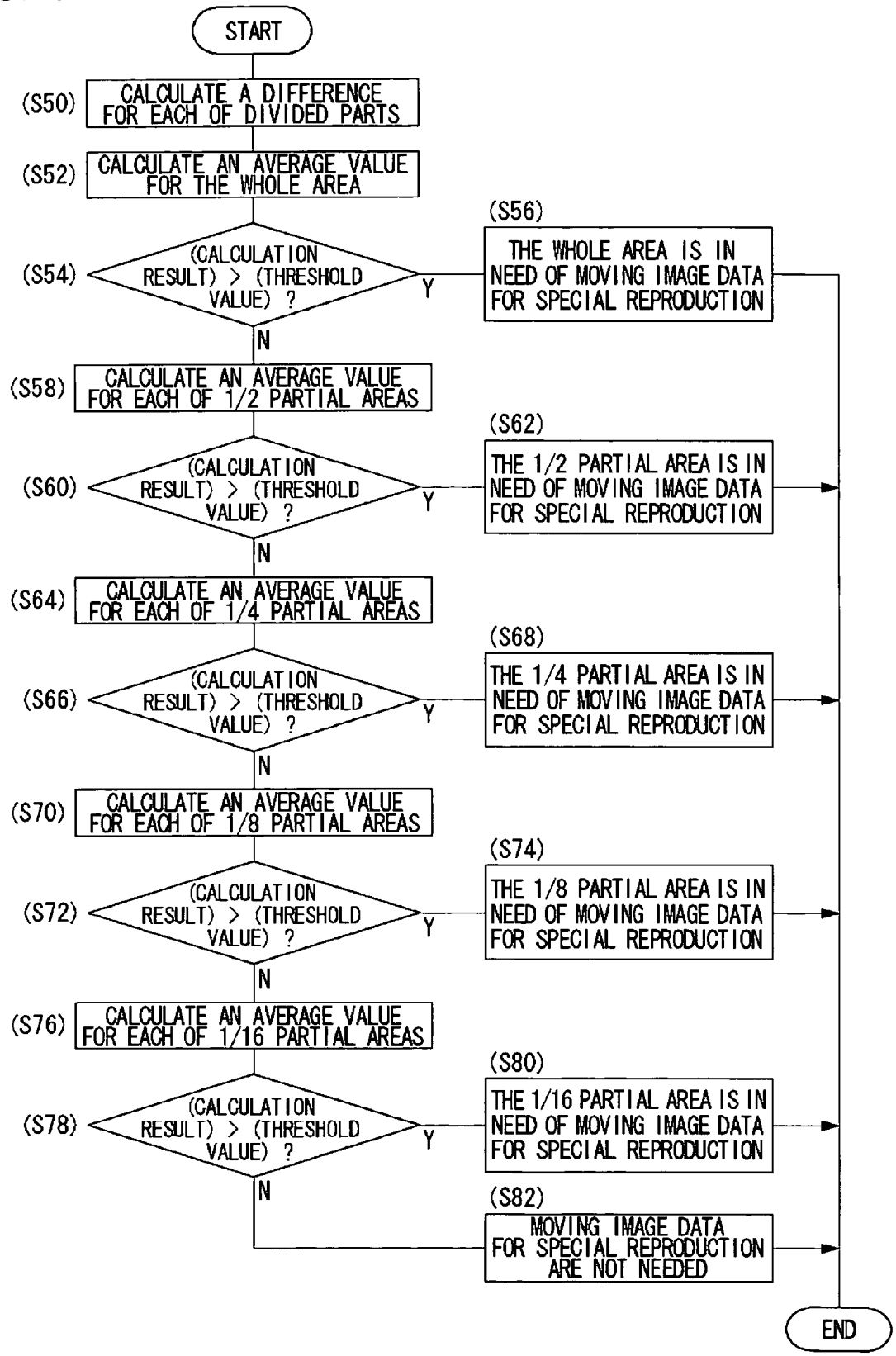
FIG. 20 shows a procedure for performing difference calculations in moving image data for normal reproduction where a display screen is divided according to the image editing apparatus shown in FIG. 18.

FIG. 20 shows a procedure for performing difference calculations. The difference calculating unit 36 shown in FIG. 18 carries out a difference calculation for each of the divided parts (S50). Through this process, sixteen kinds of calculation results are generated and inputted to the result judging unit 38. From the sixteen kinds of calculation results, the result judging unit 38 calculates an average value for the whole area (S52). This average value is compared with a predetermined threshold value, and if the average value is larger than the threshold value (Y of S54), it is judged that the differences between frames are large for the whole area and thus decided that the whole area is in need of moving image data for special reproduction (S56).

If the average value is smaller than the threshold value (N of S54), the divided parts are divided into groups of eight parts, that is, the whole area is divided into two areas (hereinafter referred to as "partial areas"). Now the average value is calculated for each of these ½ partial areas (S58). The ½ partial areas, as they are selected, may be A to H and the rest, or A, B, E, F, I, J, M and N and the rest in FIG. 19A, but the selection is not limited to these. The obtained calculation results are each compared with the threshold value. This threshold value may be defined separately from that in S54. If any of the average values is larger than the threshold value (Y of S60), it is decided that the applicable area is in need of moving image data for special reproduction (S62). If all of the average values are smaller than the threshold value (N of S60), the partial areas are each reduced to ¼ of the whole area; that is, the divided parts of the display screen of moving image data for normal reproduction are made smaller in area, and then the above calculation is repeated (S64 to S68). The area of each of these partial areas keeps being reduced until one of the average values resulting from the difference calculation becomes larger than the threshold value (S70 to S80). If all of the difference calculation results for the 1/16 partial areas of the whole area are smaller than the threshold value, it is determined that moving image data for special reproduction are not needed between the applicable frames (S82).

The image reproducing apparatus has basically the same structure as the image reproducing apparatus 102 shown in FIG. 9. However, it differs in that the information defining moving image data for special reproduction, namely, the identification information, has the size and position that indicate an area in the display screen. It also differs in the way by which the reproduction unit 114 and the monitor 20 help the user recognize the parts where moving image data for special reproduction are present. An example of the display screen is shown in FIG. 21.

Figure 21:
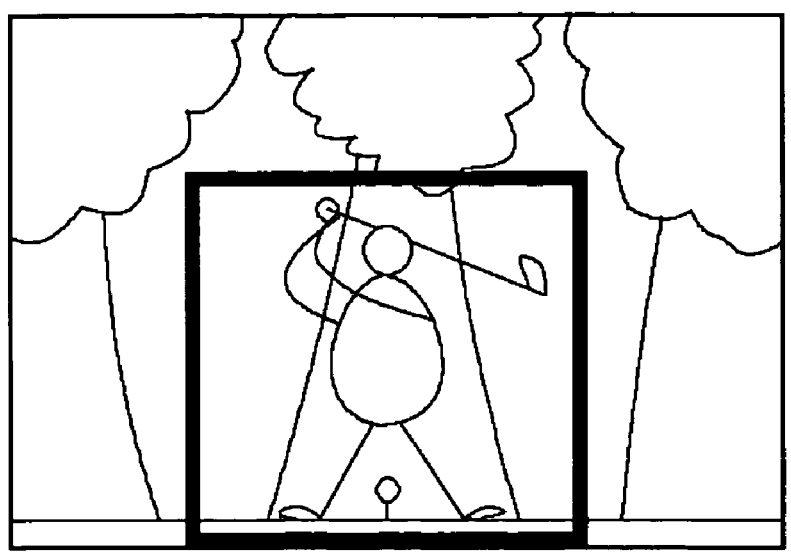
FIG. 21 shows a display screen in the reproduction of moving image data for normal reproduction according to a third embodiment of the present invention.

In FIG. 21, moving image data for special reproduction are present in the part with a human figure enclosed in a square on the display screen. Depending on the type of moving image data for normal reproduction, there may be two or more of these parts. The user instructs a slow-motion reproduction of moving image data for special reproduction by clicking a mouse on the square. A slow-motion image reproduction is the same as with the image reproducing apparatus 102 shown in FIG. 9, but it is done only in a partial area of the display screen. Namely, in this example, a slow-motion reproduction takes place in the area enclosed in the square in FIG. 21, that is, the area corresponding to F, G, J, K, N and O shown in FIG. 19A. Thus, the storage capacity required by the storage 22 as shown in FIG. 9 is made smaller by confining the moving image data for special reproduction into only necessary area of the display screen.

As a method for helping the user recognize a partial area, the partial area may be enclosed in a frame as described above, or otherwise any of the hue, brightness and chroma of the display color of the partial area may be changed.

By implementing the structure according to the third embodiment, the calculation of difference in display contents between moving image data frames for normal reproduction is performed for each of the divided areas in an image frame and the results are compared with a threshold value, so that moving image data for special reproduction can be specified for a partial area of the image frame. Moreover, since the user can select a partial area of the image frame where moving image data for special reproduction are present during the reproduction of moving image data for normal reproduction, the moving image data for special reproduction that are present in the partial area of the moving image data frame for normal reproduction can be reproduced in slow motion.

Fourth Embodiment

In a fourth embodiment of the present invention, the image editing apparatus is used connected to a fixed-point camera which captures the images of predetermined objects continuously in an environment such as outdoors where the brightness changes. Moreover, as the fixed-point camera, two kinds of cameras are used, one for generating moving images with light in the visible range and the other for generating moving images with light in the infrared range. With this apparatus, therefore, moving images are generated with light in the visible range and, in addition, moving images are further generated with light in the infrared range during the night or in such other circumstances where moving images cannot be generated by the camera for generating moving images with light in the visible range. While any part of the moving images generated by this apparatus may be reproduced by an image reproducing apparatus owned by an ordinary user, this scheme of reproducing moving images in the daytime in color images in the visible range and reproducing moving images during the night in the infrared range can provide the user with optimal moving images at all times.

The fourth embodiment relates to an image editing apparatus 100 of a type as shown in FIG. 1. This image editing apparatus may be effectively structured as shown in FIG. 4. However, the image editing apparatus according to the fourth embodiment inputs to an input unit 30 the original moving image data which comprises the original moving image data (hereinafter referred to as "visible light original moving image data") picked up by a camera (not shown) for generating moving images with light in the visible range (hereinafter referred to as "visible light camera") and the original moving image data (hereinafter referred to as "infrared original moving image data") picked up by a camera (not shown) for generating moving images with light in the infrared range (hereinafter referred to as "infrared camera"). Here, the visible light original moving image data and the infrared original moving image data, when they are inputted to the input unit 30, are bundled up into a single unit of original image data. The moving image data for normal reproduction extracting unit 44 extracts visible light original moving image data from the inputted original moving image data and outputs them as moving image data for normal reproduction.

The difference calculating unit 36 extracts infrared original moving image data from the inputted original moving image data and calculates the difference in display contents between the image frame of infrared moving image data and the image frame of moving image data for normal reproduction corresponding thereto by a method described later. The result judging unit 38 compares the results of calculation by the difference calculating unit 36 with a predetermined threshold value and specifies the section for which data for special reproduction are to be generated. The subsequent operation is the same as in the first embodiment.

Figure 22:
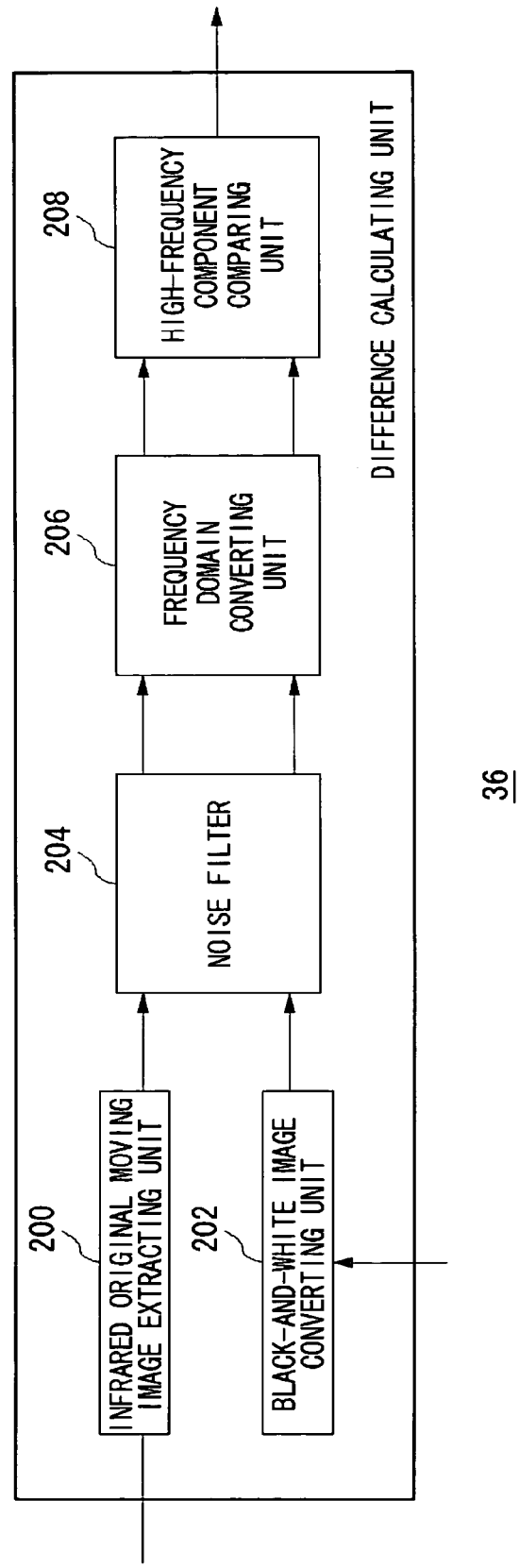
FIG. 22 shows a structure of a difference calculating unit according to a fourth embodiment of the present invention.

FIG. 22 shows a structure of a difference calculating unit 36. The difference calculating unit 36 includes an infrared original moving image extracting unit 200, a black-and-white image converting unit 202, a noise filter 204, a frequency domain converting unit 206 and a high-frequency component comparing unit 208.

The infrared original moving image extracting unit 200 extracts infrared original moving image data from moving image data for normal reproduction. In this process, used is the control information showing the position of infrared moving image data contained in the original image data.

The black-and-white image converting unit 202 converts moving image data for normal reproduction into black-and-white images (called "monochromatic images" or "light-and-shade images" also) similar to those of infrared original moving image data. (Hereinbelow, moving image data for normal reproduction converted into black-and-white images are called "moving image data for black-and-white normal reproduction.")

The noise filter 204 reduces noise contained in the infrared original moving image data and the black-and-white moving image data for normal reproduction, respectively. The frequency domain converting unit 206 converts the image frames of infrared original moving image data and the image frames of black-and-white moving image data for normal reproduction into their frequency domains, respectively.

The high-frequency component comparing unit 208 calculates the high-frequency component above a predetermined frequency for the image frames of infrared original moving image data and the image frames of black-and-white moving image data, both having been converted into the frequency domains. Then, the high-frequency component comparing unit 208 compares corresponding image frames of the two and outputs the results.

The result judging unit 38 judges that moving image data for special reproduction are required for an applicable section when the value of the high-frequency component of the image frame in the infrared original moving image data is larger than that in the moving image data for black-and-white reproduction or that they are not required when the value thereof is not.

Figure 23:
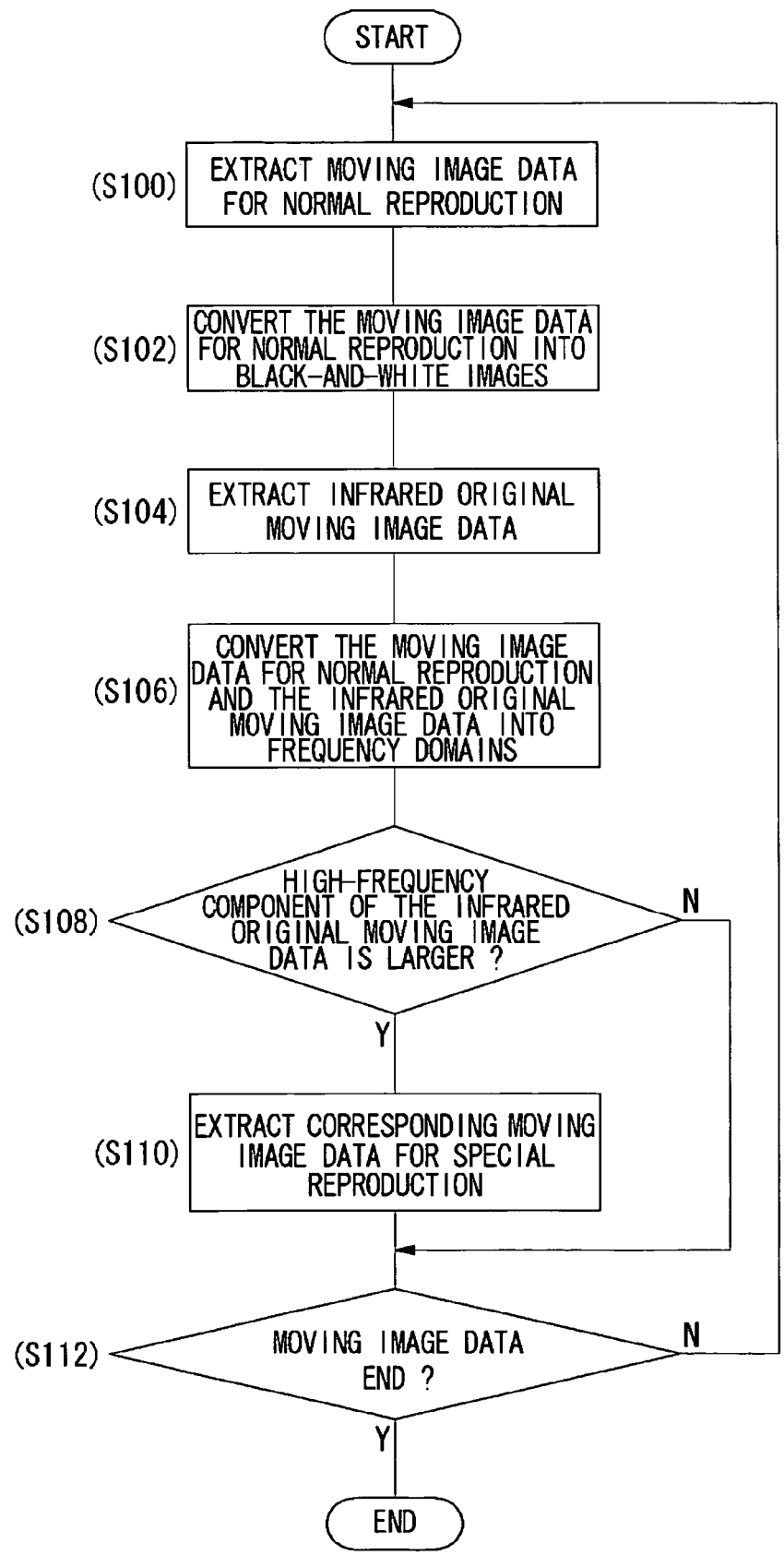
FIG. 23 shows a procedure for selecting moving image data for special reproduction in the fourth embodiment shown in FIG. 22.

FIG. 23 shows a procedure for selecting moving image data for special reproduction in the fourth embodiment. The moving image data for normal reproduction extracting unit 44 shown in FIG. 4 extracts visible light original moving image data from the original moving image data inputted to the input unit 30 as moving image data for normal reproduction (S100). The black-and-white image converting unit 202 shown in FIG. 22 converts moving image data for normal reproduction into black-and-white images (S102) and outputs moving image data for black-and-white normal reproduction. The infrared original moving image extracting unit 200 extracts infrared original moving image data from original image data (S104). After the noise filter 204 reduces noise contained in the moving image data for black-and-white normal reproduction and the infrared moving image data, the frequency domain converting unit 206 converts the image frames of moving image data for black-and-white normal reproduction and the image frames of infrared moving image data into the frequency domains (S106).

The high-frequency component comparing unit 208 calculates the high-frequency component above a predetermined frequency for the image frames of moving image data for black-and-white normal reproduction and the image frames of infrared moving image data, both having been converted into the frequency domains. When the high-frequency component of an image frame in infrared moving image data is larger than that in moving image data for black-and-white normal reproduction (Y of S108), the result judging unit 38 judges that the amount of information contained in the image frame of infrared moving image data is larger than that in moving image data for black-and-white normal reproduction, and the moving image data for special reproduction extracting unit 40 extracts corresponding moving image data for special reproduction (S110). On the other hand, when the high-frequency component of an image frame in infrared moving image data is not larger than that in moving image data for black-and-white normal reproduction (N of S108), the moving image data for special reproduction are not extracted. The above processing continues as long as there still remain the original moving image data (N of S112), but comes to an end when the moving image data for normal reproduction are terminated (Y of S112).

Figure 24A:
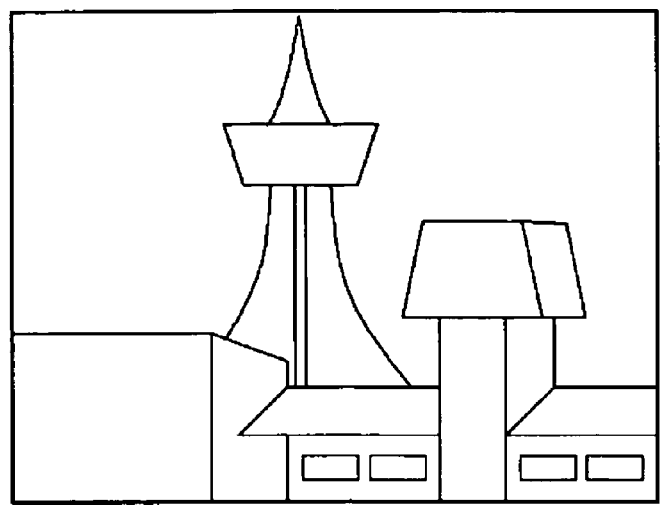
FIGS. 24A and 24B show an example of an image frame of moving image data for black-and-white normal reproduction or infrared original moving image data, according to a fourth embodiment of the present invention.
Figure 24B:
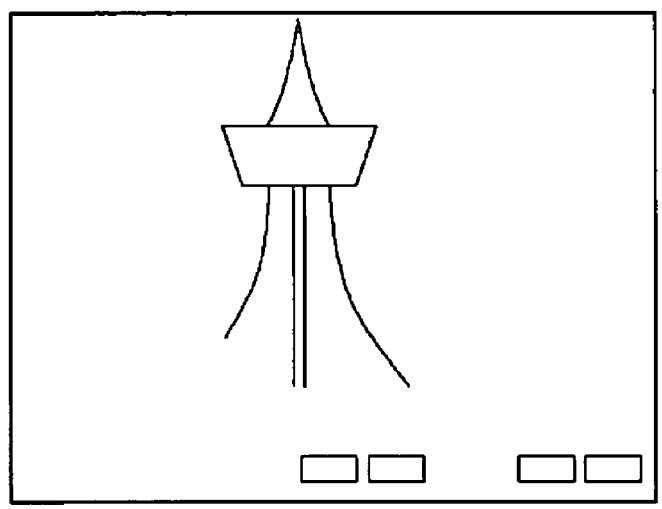

FIGS. 24A and 24B show an example in which the values of the high-frequency component of an image frame in moving image data for black-and-white normal reproduction and in infrared original moving image data are nearly equal to each other at the high-frequency component comparing unit 208 shown in FIG. 22 and an example in which the value of the latter is larger, respectively. FIG. 24A represents an example of an image frame of moving image data for black-and-white normal reproduction or an example of an image frame of infrared original moving image data, both of which are to be understood to have been captured in the daytime. When images are captured in the daytime, the image frame of moving image data for black-and-white normal reproduction and the image frame of infrared original moving image data are almost in perfect agreement with each other, so that the values of the high-frequency component of the images are nearly the same between the two.

On the other hand, when images are captured in the night time, one in FIG. 24A represents an image frame of infrared original moving image data, and one in FIG. 24B represents an image frame of moving image data for black-and-white normal reproduction. While the image is the same as one taken in the day time in FIG. 24A, the illuminated object only is displayed in FIG. 24B. As a result, the value of the high-frequency component of the image is larger in FIG. 24A.

A data stream according to the fourth embodiment may be effectively structured as shown in FIG. 8. In the fourth embodiment, however, the moving image data for normal reproduction and the moving image data for special reproduction have the same frame rate, so that the identification information for indicating a frame rate in FIG. 8C is not necessary.

The fourth embodiment relates to an image reproducing apparatus 102 of a type as shown in FIG. 1. This image reproducing apparatus may be effectively structured as shown in FIG. 9. In the fourth embodiment, however, the moving image data for normal reproduction and the moving image data for special reproduction have the same frame rate, so that the same frame rate is set for both reproductions in the reproduction unit 114.

According to the fourth embodiment, moving image data for special reproduction structured by image frames generated with light in the infrared range are generated in such a way as to be appended to moving image data for normal reproduction structured by image frames generated with light in the visible light range. However, the positions of these data are associated with each other by the identification information, so that the moving image data for special reproduction may be placed in arbitrary positions in a data stream. Moreover, the transmission band can be adjusted by preferentially transmitting moving image data for normal reproduction. Moreover, not only moving images generated with light in the visible range but also moving images generated with light in the infrared range are used, so that optimal moving images can be offered to the user by displaying ordinary color moving images in a bright environment and moving images generated with light in the infrared range in a dark environment.

Fifth Embodiment

In a fifth embodiment of the present invention, the image editing apparatus is used connected to cameras that pick up objects with varying amounts of information. Objects with varying amounts of information mean a mixed presence of objects including the sky and such other objects with small amounts of information and the buildings, signboards and such other objects with large amounts of information. Moreover, as the cameras, two kinds of cameras are used, one for generating moving images with a predetermined resolution and the other for generating moving images with higher resolution. With this apparatus, therefore, moving images are generated with a predetermined resolution for objects with varying amounts of information as a whole and, in addition, moving images are further generated with higher resolution for the part of the objects with greater amounts of information. Though any part of the moving images generated by this apparatus may be reproduced by an image reproducing apparatus owned by an ordinary user, moving images with a predetermined resolution are reproduced for the part of objects with relatively small amounts of information, and moving images with higher resolution are reproduced for the part of objects with greater amounts of information. As a result thereof, more detailed moving images may be provided for areas of the moving images which the user desires to see more closely.

The fifth embodiment relates to an image editing apparatus 100 of a type as shown in FIG. 1. This image editing apparatus may be effectively structured as shown in FIG. 4. However, the image editing apparatus according to the fifth embodiment inputs to an input unit 30 the original moving image data which comprises the original moving image data picked up by a camera (not shown) with a predetermined resolution (hereinafter referred to as "normal resolution original moving image data") and the original moving image data picked up by a camera (not shown) with a higher resolution (hereinafter referred to as "higher resolution original moving image data"). Here, the normal resolution original moving image data and the higher resolution original moving image data, when they are inputted to the input unit 30, are bundled up into a single unit of original image data. The moving image data for normal reproduction extracting unit 44 extracts normal resolution original moving image data from the inputted original moving image data and outputs them as moving image data for normal reproduction.

The difference calculating unit 36 calculates the difference between the value of the high-frequency component of normal resolution original image data and a predetermined threshold value. Based on the results of calculation by the difference calculating unit 36, the result judging unit 38 specifies the section for which data for special reproduction are to be generated. The subsequent operation is the same as in the first embodiment.

Figure 25:
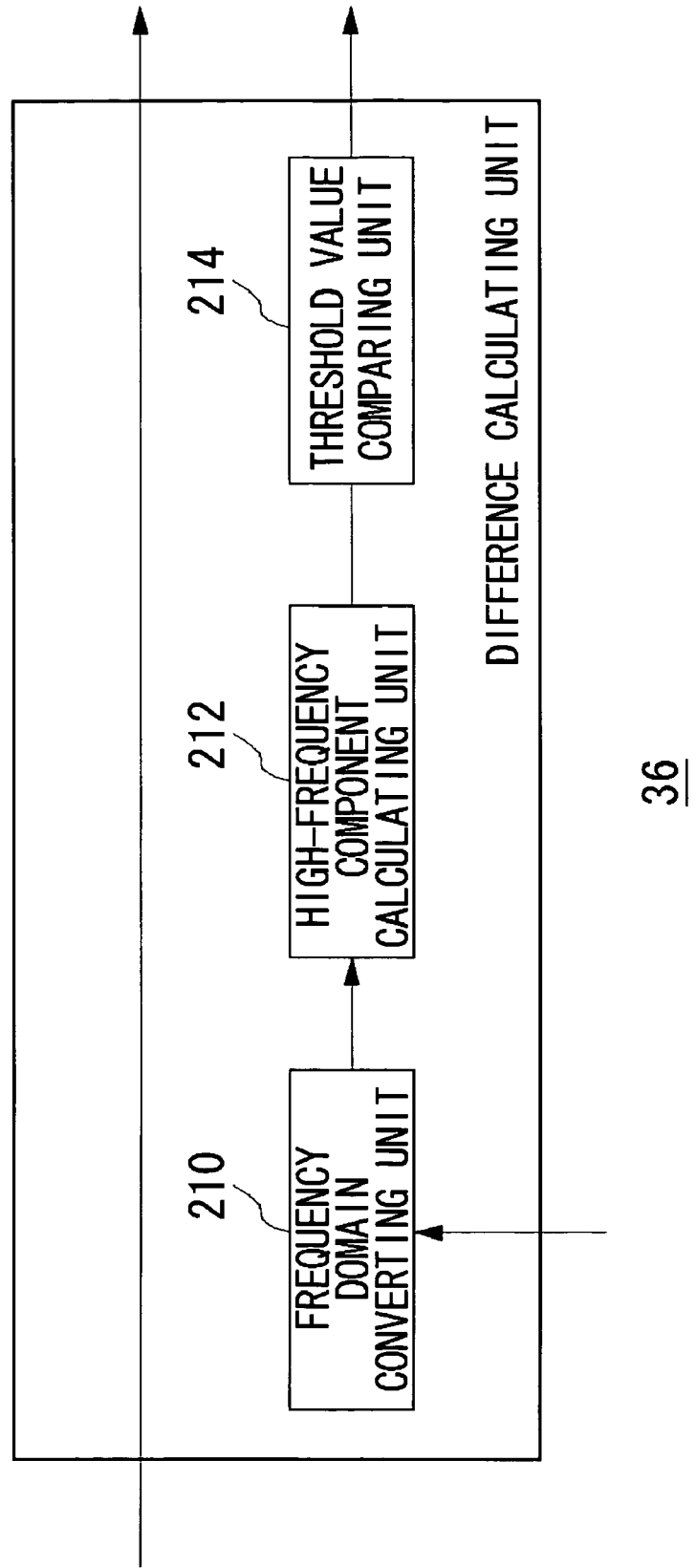
FIG. 25 shows a structure of a difference calculating unit according to a fifth embodiment of the present invention.

FIG. 25 shows a structure of a difference calculating unit 36. The difference calculating unit 36 includes a frequency domain converting unit 210, a high-frequency component calculating unit 212 and a threshold value comparing unit 214.

The frequency domain converting unit 210 converts the image frames of moving image for normal reproduction into the frequency domain.

The high-frequency component calculating unit 212 calculates the value of the high-frequency component above a predetermined frequency for the image frames of moving image data for normal reproduction having been converted into the frequency domain and outputs the results.

The threshold value comparing unit 214 compares the results of calculation by the high-frequency component calculating unit 212 with a predetermined threshold value and outputs the results.

The result judging unit 38 judges that moving image data for special reproduction are required for an applicable section when the value of the high-frequency component of an image frame in moving image data for normal reproduction is larger than the threshold value or that they are not required when the value thereof is not.

The procedure shown in conjunction with FIG. 23 may be effectively used as a procedure for selecting moving image data for special reproduction according to the fifth embodiment. Here, some differences therefrom will be described. First, Step 102, in which moving image data for normal reproduction are converted into moving image data for black-and-white normal reproduction, is not necessary. Moreover, since the infrared moving image data are also unnecessary, a decision on the necessity of moving image data for special reproduction in Step 108 is to be made by comparing the high-frequency component of the image frame of the moving image data for normal reproduction with the threshold value.

The structure of a data stream according to the fifth embodiment may be basically equal to that according to the fourth embodiment. In this fifth embodiment, however, the difference in resolution between the moving image data for normal reproduction and the moving image data for special reproduction is reflected in the identification information showing the size in FIG. 8C.

The fifth embodiment relates to an image reproducing apparatus 102 of a type as shown in FIG. 1. This image reproducing apparatus may be effectively structured as shown in FIG. 9.

Figure 26A:
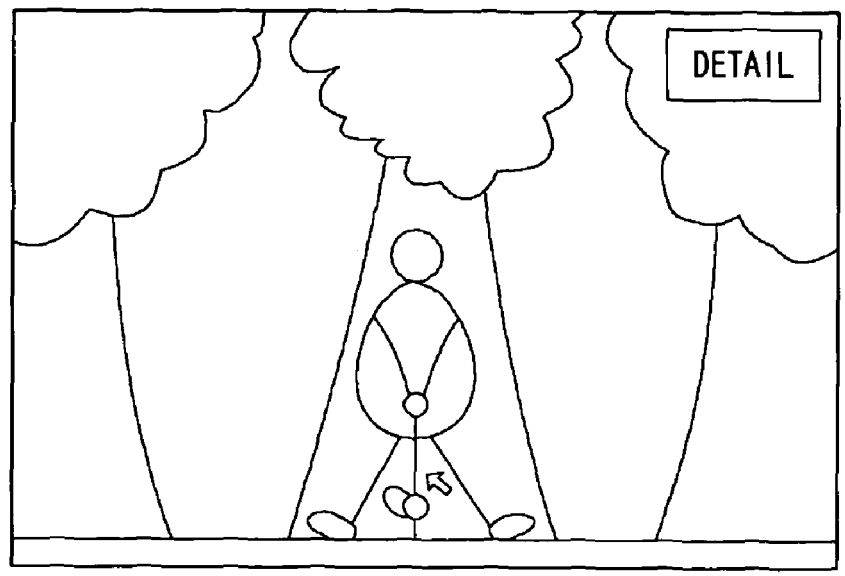
FIGS. 26A and 26B shows display screens to reproduce moving image data for normal reproduction and moving image data for special reproduction, respectively, according to the image reproducing apparatus shown in FIG. 9.
Figure 26B:
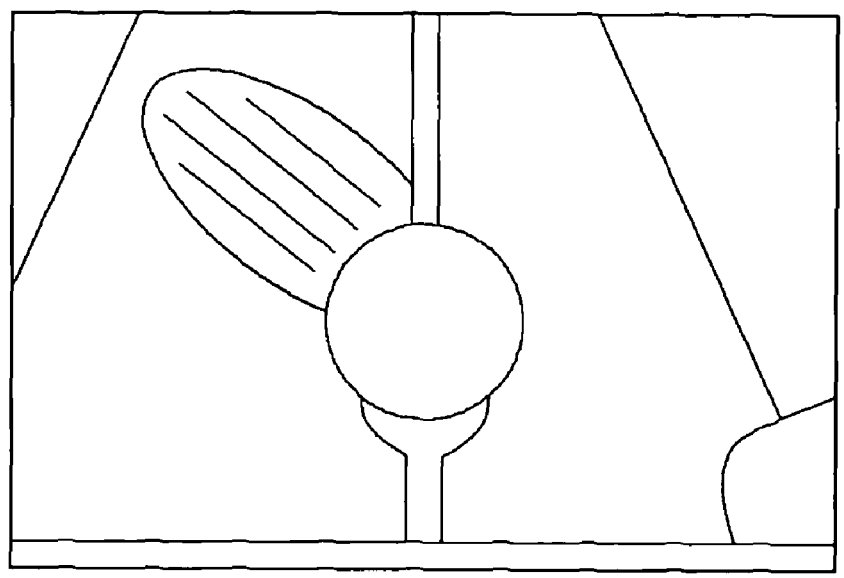

The instruction receiving unit 124 receives instructions from the user to reproduce in an enlarged display a partial area of an image frame of the moving image data for special reproduction for a section in which the moving image data for special reproduction are present within the moving image data for normal reproduction. FIGS. 26A and 26B show a concrete example of a method for inputting instructions from the user. FIG. 26A shows an example of an image frame of the moving image data for normal reproduction. Here, moving image data for special reproduction corresponding to this image frame are present, and the characters "DETAIL" are displayed in the upper right corner of the image frame so as to help the user recognize the fact. An "arrow" in the image frame is the pointer of a mouse, and the instruction for a reproduction in an enlarged display of the applicable position are considered to have been inputted when the user clicks the mouse at the arrow position.

FIG. 26B shows an image frame of the moving image data for special reproduction corresponding to the image frame of FIG. 26A. When the image frame of FIG. 26A is of 640×480 dots, the image frame of FIG. 26B is also of 640×480 dots. However, since the resolution of the moving image data for special reproduction is higher than that of the moving image data for normal reproduction, the image frame of FIG. 26B becomes an enlarged display of a partial area of the image frame of FIG. 26A. The coordinates of the center of the image frame of FIG. 26B are the position of the arrow where the mouse is clicked on the image frame of FIG. 26A, and the reproduction determining unit 122 calculates the coordinates of the display area based on the clicked arrow position.

The reproduction unit 114 displays selectively an image frame of moving image data for normal reproduction as shown in FIG. 26A or an image frame of moving image data for special reproduction as shown in FIG. 26B. Since the moving image data for normal reproduction and the moving image data for special reproduction have the same frame rate in the fifth embodiment, an identical frame rate is set for both the reproductions.

According to the fifth embodiment, moving image data for special reproduction with a higher resolution are generated in such a way as to be appended to moving image data for normal reproduction with a predetermined resolution. However, the positions of these data are associated with each other by identification information, so that the moving image data for special reproduction can be placed in arbitrary positions in a data stream. Moreover, the transmission band can be adjusted by preferentially transmitting moving image data for normal reproduction. Moreover, moving images with a predetermined resolution and moving images with a higher resolution are used for the same objects, so that the moving images with a predetermined resolution can be used for objects with simple forms and thus smaller amounts of information whereas the moving images with a higher resolution can be used for objects with complex forms and thus larger amounts of information.

The present invention has been described based on the embodiments which are only exemplary. It is understood by those skilled in the art that there exist other various modifications to the combination of each component and process described above and that such modifications are encompassed by the scope of the present invention. Such modified examples will be described hereinbelow.

In the first to third embodiments, a single camera 10 is used for generating original moving image data. However, a plurality of cameras 10 with mutually different frame rates may be used; for instance, original moving image data with a high-speed frame rate (hereinafter referred to as "high-speed original moving image data") and original moving image data with a standard frame rate (hereinafter referred to as "low-speed original moving image data") may be generated by two cameras. In an actual application, the camera 10 for low-speed original moving image data may be one ordinarily found in the photographic scene, and this may be supplemented by another camera for high-speed original moving image data that can satisfy the level required by the present embodiments. In the image editing unit 100, the input unit 30 may be provided with two input terminals in correspondence to the two cameras 10. A synchronizing unit may be provided to establish synchronism by a predetermined method, which is designed to reduce the timing error between the high-speed original moving image data and the low-speed original moving image data. According to this modified example, the low-speed original moving image data may be used directly as moving image data for normal reproduction, thus shortening the time for generating the moving image data for normal reproduction. Moreover, by changing the shooting position and angle of the two cameras, an application in a baseball broadcast, such as reproducing in slow motion a batter seen from different angles, may be realized. Namely, any such application may be implemented so long as original moving image data that can be edited are generated.

In the first to third embodiments, difference calculation at the moving image data for special reproduction selector 34 is used to designate a section for which moving image data for special reproduction are generated. However, methods other than difference calculation may be used to designate the section; for example, it may be designated by direct instructions from a moving image editor via a predetermined interface. The image editing unit 100 may be provided with an instruction receiving unit to receive such instructions. Further, a moving image data for special reproduction determining unit may be provided to determine a section for which moving image data for special reproduction are generated, based on information from the instruction receiving unit. According to this modified example, the intents in editing may be reflected directly. Namely, the section for which moving image data for special reproduction are generated is determined exactly according to instructions given in a predefined manner.

In the first to third embodiments, a slow-motion reproduction of moving image data for special reproduction is carried out for a section designated by the user. However, the slow-motion reproduction of moving image data for special reproduction is not limited to this mode; for example, the slow-motion reproduction of moving image data for special reproduction may be carried out automatically along with the normal reproduction of moving image data for normal reproduction. The image reproducing unit 102 may be provided with a reproduction timing adjusting unit, and thus the timing between the normal reproduction of moving image data for normal reproduction and the slow-motion reproduction of moving image data for special reproduction may be adjusted automatically by a method similar to one illustrated in FIGS. 16A and 16B. According to this modified example, user operation is no longer needed for a slow-motion reproduction. Namely, it works if the moving image data for special reproduction are subjected to a slow-motion reproduction in a predefined sequence.

In the first to third embodiments, the necessity for moving image data for special reproduction between corresponding frames is judged by the calculation of differences between frames at the moving image data for special reproduction selector 34. However, the decision may be made not only based on the results of one time of difference calculation but also based on the results of two or more times of difference calculation. According to this modified example, for example, at scene change, where differences between adjacent frames are not large for a plurality of frames, it is not necessary to add moving image data for special reproduction for that part to the data stream. Namely, it suffices that the judgment on the necessity for moving image data for special reproduction is made after performing a statistical processing, such as averaging, on the results of difference calculation.

In the first embodiment, the presence or absence of moving image data for special reproduction is determined by checking the contents of identification information. However, the presence or absence of moving image data for special reproduction may also be determined without checking the contents of identification information. For example, if a rule is made that there is no identification information when there are no moving image data for special reproduction, then the presence or absence of identification information may be used to decide on the presence or absence of moving image data for special reproduction. According to this modified example, the utilization factor of the data stream will improve provided that a necessary rule is established between the image editing unit 100 and the image reproducing unit 102.

In the first embodiment, the interval between moving image data frames for special reproduction at which difference calculation is performed by the difference calculating unit 36 is fixed at the interval between adjacent frames. However, this interval may vary according to a predefined rule. Then, the threshold value may also vary according to the interval of moving image data frames for normal reproduction. Further, the interval between moving image data frames for normal reproduction at which difference calculation is performed may be fixed at the interval of a plurality of frames. According to this modified example, the movements in display contents of moving images that cannot be detected at the interval of adjacent frames can be detected.

In the first embodiment, a slow-motion part of moving image data frames for special reproduction is reproduced at a standard frame rate defined by the image reproducing unit 102. However, other frame rates may be used for the reproduction; for example, frame rates slower than the standard frame rate may be used. According to this modified example, the movements in display contents of moving images may be shown more clearly. Namely, the user can use any frame rate at which he/she can see and understand the details of movements of the moving image data for normal reproduction.

In the first to third embodiments, a section where movements in display contents are large is specified, based on the calculation of differences between frames, by the difference calculating unit 36. However, image processings other than difference calculation may also be used; for example, the size of movement may be judged by detecting a motion vector attached to every macroblock in MPEG. According to this modified example, the difference calculation processing can be omitted. Namely, it suffices that the section with large movements of display images is specified by any image processing that is suited to the format of the original image data.

In the first to third embodiments, moving image data for special reproduction are generated with attention directed to the size of movements at the moving image data for special reproduction selector 34. However, they may also be generated with attention directed to attributes other than that. For example, an area containing relatively more high-frequency components in original moving images is specified, and moving image data for special reproduction may be generated for this specified area. In this case, the area which has a greater amount of information or very fine objects projected in the first place may be subjected to a smooth slow-motion reproduction, thus enhancing the visibility of the moving images.

As for the other attributes, attention may be directed to pixel values, such as specific color components contained in the original moving images. A pattern matching for picture recognition may be done on a predetermined object, and attention may be directed to the results of the matching.

In the first to third embodiments, original moving images are mostly those captured by a camera 10. However, original moving images may also be what has been generated by computer graphics. In such a case, images having undergone rendering and video conversion may be used directly as original moving images in such processing as covered by any of the embodiments, or new processing may be carried out using part of the information before rendering. Such a new processing may be, for example, a case where an object are generated by further many and small polygons, and therefore, the moving image data for special reproduction are generated for the area of this object by increasing the number of frames generated by rendering. According to this modified example, frames with more detailed contents can be generated.

In the first to third embodiments, the difference calculation is performed based on the moving image data for normal reproduction. However, as indicated by a chain double-dashed line in FIG. 4 or FIG. 18, the difference calculation may also be performed based on original moving image data or moving image data of high-speed frame rate. Moreover, the difference calculation may also be performed based on a plurality of moving image data with different frame rates, not simply based on a single piece of moving image data. In such a case, the difference between a predetermined frame of moving image data with a low-speed frame rate and the frame of moving image data with a high-speed frame rate corresponding to said frame is calculated. Referring to FIG. 6, the difference between the frame S2 of moving image data with a low-speed frame rate and at least one of the frames F2 to F4 or F6 to F8 of moving image data with a high-speed frame rate is calculated.

In the first to third embodiments, moving image data with a high-speed frame rate are used as original moving image data. However, as original moving image data, moving image data with a frame rate approximately equal to that of moving image data for normal reproduction may also be used. In such a case, the moving image data for normal reproduction are generated by directly utilizing the original moving image data, and the moving image data for special reproduction are generated by increasing the number of frames by appropriately interpolating the original moving image data and then generating moving image data having a desired frame rate.

In the first to third embodiments, a standard frame rate, which is the frame rate of moving image data for normal reproduction, is set in correspondence to a refresh rate, which is equivalent to the vertical scanning frequency of the monitor 20 on the image viewer side. However, the setting scheme is not limited thereto, and other standard frame rates may be used provided that they are lower than the frame rate of moving image data for special reproduction.

In the third embodiment, the image area is divided into a plurality of partial areas and the difference between frames is calculated for each of the divided partial areas. And when these difference values are smaller than a threshold value, the image area is further divided into smaller partial areas and the difference between frames is calculated for each of the further divided partial areas. However, the image area may be divided into an appropriately large number of partial areas from the beginning and the difference between frames may be calculated for each of the large number of divided partial areas. And by comparing these difference values with a threshold value, the division of the image area and the comparison of these difference values with a threshold value can be finished by a single process.

In the fourth and fifth embodiments, two cameras, namely, a visible light camera and an infrared camera in the former and a camera with a predetermined resolution and a camera with a higher resolution in the latter, are used in the respective systems. However, the present embodiments are not limited to this scheme. In the fourth embodiment, for example, light in the visible range and light in the infrared range, both reflected from the objects, may be taken in through a single lens and then separated by a prism into the two kinds of light, which are inputted to a visible light image processing unit and an infrared image processing unit, respectively. Moreover, in the fifth embodiment, for example, higher resolution original moving image data may be generated by using a higher resolution camera only and then normal resolution original moving image data may be generated by lowering the resolution of the higher resolution original moving image data.

In the fourth and fifth embodiments, a section for which moving image data for special reproduction are needed is automatically specified and moving image data for special reproduction are generated for said section. However, the present embodiments are not limited to this scheme. For example, the image editor may directly check the original image data and specify the section for which moving image data for special reproduction are to be generated.

In the fourth and fifth embodiments, moving image data for special reproduction are generated for the whole image frame constituting moving image data for normal reproduction. However, the present embodiments are not limited to this scheme. For example, in the same manner as in the third embodiment, moving image data for special reproduction may be generated for a partial area of the image frame only. In this case, the generation and reproduction of the moving image data for special reproduction are realized by the same method as in the third embodiment.

In the fourth embodiment, the values of high-frequency component of black-and-white normal reproduction data and infrared original moving image data are compared to specify the section for which moving image data for special reproduction are to be generated. However, the decision may be made in other ways. For example, a threshold value may be determined beforehand, and when the brightness of the black-and-white normal reproduction data is smaller than the threshold value, moving image data for special reproduction may be generated. Moreover, edges may be detected by an arbitrary method from the corresponding image frames of black-and-white normal reproduction data and infrared original moving image data, respectively, and when the edges detected from the image frame of the infrared original moving image data are more than those from the black-and-white normal reproduction data, moving image data for special reproduction may be generated.

In the fifth embodiment, the value of high-frequency component of moving image data for normal reproduction are compared with a threshold value to specify the section for which moving image data for special reproduction are to be generated. However, the present embodiments are not limited to this scheme. For example, the value of high-frequency component of higher resolution original moving image data may be compared with a threshold value, and when the value of the high-frequency component is larger than the threshold value, moving image data for special reproduction may be generated. Moreover, the values of high-frequency component of moving image data for normal reproduction and higher resolution original moving image data may be compared, and when the latter is larger, moving image data for special reproduction may be generated.

In the fifth embodiment, a camera with a higher resolution is used in addition to a camera with a predetermined resolution. However, the present embodiments are not limited to the camera, and the additional camera may, for example, be a telecamera which is a narrow-angle camera. The telecamera may be substituted by a zoom camera. In this case, the distance to the objects within an image may be measured with a Z camera in order to specify the section for which moving image data for special reproduction are to be generated, and when the distance to the objects is larger than a predetermined threshold value, moving image data for special reproduction may be generated from the higher resolution original moving image data captured by the telecamera.

In the fifth embodiment, the reproduction unit 114 displays the image frame of moving image data for normal reproduction and the image frame of moving image data for special reproduction with the same number of pixels, and accordingly, a partial area of the image frame of moving image data for special reproduction is displayed selectively. However, the display size of the moving images of moving image data for special reproduction is not limited thereto. For example, a display may be produced after converting the resolution of the image frame of moving image data for special reproduction into the resolution of the image frame of moving image data for normal reproduction. Moreover, a display may be produced in a size larger than the moving image of moving image data for normal reproduction, which reflects the difference in resolution between moving image data for special reproduction and moving image data for normal reproduction.

Although the present invention has been described by way of exemplary embodiments, it should be understood that many changes and substitutions may further be made by those skilled in the art without departing from the scope of the present invention which is defined by the appended claims.

What is claimed is:

1. An image reproducing apparatus, including:
   an input unit which inputs signals for use in at least reproducing images;
   a first data selector which acquires moving image data, formed by image frames having a predetermined amount of information, for use with normal reproduction, from the signals inputted in said input unit;
   a position specifying unit which acquires, from the inputted signals, information indicative of a relationship between moving image data for special reproduction and the moving image data for normal reproduction, and which specifies from the information a position where the moving image data for special reproduction is present, wherein the moving image data for special reproduction are formed by image frames which have the equal composition to images within the frame images that form the moving image data for normal reproduction and which have a different amount of information from the images that form the moving image for normal reproduction;
   a second data selector which acquires, from the position specified, the moving image data for special reproduction; and
   a reproduction unit which reproduces the moving image data for normal reproduction and reproduces, as appropriate, the moving image data for special reproduction, wherein differences between adjacent frames are successively calculated in the moving image data for normal reproduction, and the moving image data for special reproduction included in the signals input by the input unit is generated in a section where the difference is greater than a threshold value,
the moving image data for special reproduction are provided for a partial area within image frames that form the moving image data for normal reproduction,
the moving image data for special reproduction is generated at a frame rate higher than a frame rate to generate the moving image data for normal reproduction,
the reproduction unit displays the partial area where the moving image data for special reproduction are present, in a form recognizable by a user, and, when reproducing the moving image data for special reproduction, said reproduction unit reproduces the thus provided moving image data for special reproduction for the partial area,
the reproduction unit reproduces the moving image data for special reproduction at a frame rate lower than a frame rate at which the moving image data for special reproduction is generated, and
the image reproducing apparatus further including an instruction receiving unit which receives an instruction to the effect that a user wishes to reproduce the moving image data for special reproduction for the partial area displayed.

2. The image reproducing apparatus according to claim 1, wherein, in a display screen showing image frames forming the moving image data for normal reproduction, the reproduction unit displays the partial area associated with the moving image data for special reproduction by enclosing the area in a square.

3. The image reproducing apparatus according to claim 1, wherein the input signals do not contain the moving image data for special reproduction, and wherein, after the position has been specified by said position specifying unit, said second data selector acquires the moving image data for special reproduction from the specified position via said input.

4. An image reproducing apparatus, including:
   an input unit which inputs signals for use in at least reproducing images;
   a first data selector which acquires moving image data, formed by image frames having a predetermined amount of information, for use with normal reproduction, from the signals inputted in said input unit;
   a position specifying unit which acquires, from the inputted signals, information indicative of a relationship between moving image data for special reproduction and the moving image data for normal reproduction, and which specifies from the information a position where the moving image data for special reproduction is present, wherein the moving image data for special reproduction are formed by image frames which have the equal composition to images within the frame images that form the moving image data for normal reproduction and which have a different amount of information from the images that form the moving image for normal reproduction;
   a second data selector which acquires, from the position specified, the moving image data for special reproduction; and
   a reproduction unit which reproduces the moving image data for normal reproduction and reproduces, as appropriate, the moving image data for special reproduction, wherein differences between adjacent frames are successively calculated in the moving image data for normal reproduction, and the moving image data for special reproduction included in the signals input by the input unit is generated in a section where the difference is greater than a threshold value, the moving image data for special reproduction are provided for a predetermined section in the moving image data for normal reproduction, the moving image data for special reproduction is generated at a frame rate higher than a frame rate to generate the moving image data for normal reproduction, the reproduction unit displays the predetermined section where the moving image data for special reproduction are present, in a form recognizable by a user, and reproduces the moving image data for special reproduction for the predetermined section, the reproduction unit reproduces the moving image data for special reproduction at a frame rate lower than a frame rate at which the moving image data for special reproduction is generated, and the image reproducing apparatus further including an instruction receiving unit which receives an instruction to the effect that a user wishes to reproduce the moving image data for special reproduction for the predetermined section displayed.

5. The image reproducing apparatus according to claim 4, wherein the reproduction unit displays thumbnail images of image frames forming the moving image data for normal reproduction, and displays image frames forming the moving data for normal reproduction that are associated with the moving image data for special reproduction in a mode different from that of non-associated image frames.

6. The image reproducing apparatus according to claim 4, wherein the input signals do not contain the moving image data for special reproduction, and wherein, after the position has been specified by said position specifying unit, said second data selector acquires the moving image data for special reproduction from the specified position via said input.

7. An image reproducing method, including:

inputting signals for use in at least reproducing images;

acquiring moving image data, formed by image frames having a predetermined amount of information, for use with normal reproduction, from the original image data;

acquiring, from the inputted signals, information indicative of a relationship between moving image data for special reproduction and the moving image data for normal reproduction, and specifying from the information a position where the moving image data for special reproduction is present, wherein the moving image data for special reproduction are formed by image frames which have the equal composition to images within the frame images that form the moving image data for normal reproduction and which have a different amount of information from the images that form the moving image for normal reproduction;

acquiring, from the specified position, the moving image data for special reproduction; and reproducing the moving image data for normal reproduction and reproducing, as appropriate, the moving image data for special reproduction, wherein differences between adjacent frames are successively calculated in the moving image data for normal reproduction, and the moving image data for special reproduction included in the signals input by the step of inputting is generated in a section where the difference is greater than a threshold value, the moving image data for special reproduction are provided for a partial area within image frames that form the moving image data for normal reproduction, the moving image data for special reproduction is generated at a frame rate higher than a frame rate to generate the moving image data for normal reproduction, the reproducing displays the partial area where the moving image data for special reproduction are present, in a form recognizable by a user, and reproduces, when reproducing the moving image data for special reproduction, the moving image data for special reproduction for the partial area, the step of reproducing reproduces the moving image data for special reproduction at a frame rate lower than a frame rate at which the moving image data for special reproduction is generated, and the image reproducing method further including receiving an instruction to the effect that a user wishes to reproduce the moving image data for special reproduction for the partial area displayed.

8. An image reproducing method, including:

inputting signals for use in at least reproducing images;

acquiring moving image data, formed by image frames having a predetermined amount of information, for use with normal reproduction, from the original image data;

acquiring, from the inputted signals, information indicative of a relationship between moving image data for special reproduction and the moving image data for normal reproduction, and specifying from the information a position where the moving image data for special reproduction is present, wherein the moving image data for special reproduction are formed by image frames which have the equal composition to images within the frame images that form the moving image data for normal reproduction and which have a different amount of information from the images that form the moving image for normal reproduction;

acquiring, from the specified position, the moving image data for special reproduction; and reproducing the moving image data for normal reproduction and reproducing, as appropriate, the moving image data for special reproduction, wherein differences between adjacent frames are successively calculated in the moving image data for normal reproduction, and the moving image data for special reproduction included in the signals input by the step of inputting is generated in a section where the difference is greater than a threshold value, the moving image data for special reproduction are provided for a predetermined section in the moving image data for normal reproduction, the moving image data for special reproduction is generated at a frame rate higher than a frame rate to generate the moving image data for normal reproduction, the reproducing displays the predetermined section where the moving image data for special reproduction are present, in a form recognizable by a user, and reproduces the moving image data for special reproduction for the predetermined section, the step of reproducing reproduces the moving image data for special reproduction at a frame rate lower than a frame rate at which the moving image data for special reproduction is generated, and the image reproducing method further including receiving an instruction to the effect that a user wishes to reproduce the moving image data for special reproduction for the predetermined section displayed.

9. A program product embodied on a non-transitory computer readable medium, the program including the functions of:

inputting signals for use in at least reproducing images;

acquiring moving image data, formed by image frames having a predetermined amount of information, for use with normal reproduction, from the original image data;

acquiring, from the inputted signals, information indicative of a relationship between moving image data for special reproduction and the moving image data for normal reproduction, and specifying from the information a position where the moving image data for special reproduction is present, wherein the moving image data for special reproduction are formed by image frames which have the equal composition to images within the frame images that form the moving image data for normal reproduction and which have a different amount of information from the images that form the moving image for normal reproduction;

acquiring, from the specified position, the moving image data for special reproduction; and reproducing the moving image data for normal reproduction and reproducing, as appropriate, the moving image data for special reproduction, wherein differences between adjacent frames are successively calculated in the moving image data for normal reproduction, and the moving image data for special reproduction included in the signals input by the step of inputting is generated in a section where the difference is greater than a threshold value, the moving image data for special reproduction are provided for a partial area within image frames that form the moving image data for normal reproduction, the moving image data for special reproduction is generated at a frame rate higher than a frame rate to generate the moving image data for normal reproduction, the reproducing displays the partial area where the moving image data for special reproduction are present, in a form recognizable by a user, and reproduces, when reproducing the moving image data for special reproduction, the moving image data for special reproduction for the partial area, the step of reproducing reproduces the moving image data for special reproduction at a frame rate lower than a frame rate at which the moving image data for special reproduction is generated, and the program further including receiving an instruction to the effect that a user wishes to reproduce the moving image data for special reproduction for the partial area displayed.

10. A program product embodied on a non-transitory computer readable medium, the program including the functions of:

acquiring moving image data, formed by image frames having a predetermined amount of information, for use with normal reproduction, from the original image data;

acquiring, from the inputted signals, information indicative of a relationship between moving image data for special reproduction and the moving image data for normal reproduction, and specifying from the information a position where the moving image data for special reproduction is present, wherein the moving image data for special reproduction are formed by image frames which have the equal composition to images within the frame images that form the moving image data for normal reproduction and which have a different amount of information from the images that form the moving image for normal reproduction;

acquiring, from the specified position, the moving image data for special reproduction; and reproducing the moving image data for normal reproduction and reproducing, as appropriate, the moving image data for special reproduction, wherein differences between adjacent frames are successively calculated in the moving image data for normal reproduction, and the moving image data for special reproduction included in the signals input by the step of inputting is generated in a section where the difference is greater than a threshold value, the moving image data for special reproduction are provided for a predetermined section in the moving image data for normal reproduction, the moving image data for special reproduction is generated at a frame rate higher than a frame rate to generate the moving image data for normal reproduction, the reproducing displays the predetermined section where the moving image data for special reproduction are present, in a form recognizable by a user, and reproduces the moving image data for special reproduction for the predetermined section, the step of reproducing reproduces the moving image data for special reproduction at a frame rate lower than a frame rate at which the moving image data for special reproduction is generated, and the program further including receiving an instruction to the effect that a user wishes to reproduce the moving image data for special reproduction for the predetermined section displayed.

11. A non-transitory computer-readable recording medium which stores a program executable by a computer, the program including the functions of:

inputting signals for use in at least reproducing images;

acquiring moving image data, formed by image frames having a predetermined amount of information, for use with normal reproduction, from the original image data;

acquiring, from the inputted signals, information indicative of a relationship between moving image data for special reproduction and the moving image data for normal reproduction, and specifying from the information a position where the moving image data for special reproduction is present, wherein the moving image data for special reproduction are formed by image frames which have the equal composition to images within the frame images that form the moving image data for normal reproduction and which have a different amount of information from the images that form the moving image for normal reproduction;

acquiring, from the specified position, the moving image data for special reproduction; and reproducing the moving image data for normal reproduction and reproducing, as appropriate, the moving image data for special reproduction, wherein differences between adjacent frames are successively calculated in the moving image data for normal reproduction, and the moving image data for special reproduction included in the signals input by the step of inputting is generated in a section where the difference is greater than a threshold value, the moving image data for special reproduction are provided for a partial area within image frames that form the moving image data for normal reproduction, the moving image data for special reproduction is generated at a frame rate higher than a frame rate to generate the moving image data for normal reproduction, the reproducing displays the partial area where the moving image data for special reproduction are present, in a form recognizable by a user, and reproduces, when reproducing the moving image data for special reproduction, the moving image data for special reproduction for the partial area, the step of reproducing reproduces the moving image data for special reproduction at a frame rate lower than a frame rate at which the moving image data for special reproduction is generated, and the program further including receiving an instruction to the effect that a user wishes to reproduce the moving image data for special reproduction for the partial area displayed.

12. A non-transitory computer-readable recording medium which stores a program executable by a computer, the program including the functions of:

acquiring moving image data, formed by image frames having a predetermined amount of information, for use with normal reproduction, from the original image data;

acquiring, from the inputted signals, information indicative of a relationship between moving image data for special reproduction and the moving image data for normal reproduction, and specifying from the information a position where the moving image data for special reproduction is present, wherein the moving image data for special reproduction are formed by image frames which have the equal composition to images within the frame images that form the moving image data for normal reproduction and which have a different amount of information from the images that form the moving image for normal reproduction;

acquiring, from the specified position, the moving image data for special reproduction; and reproducing the moving image data for normal reproduction and reproducing, as appropriate, the moving image data for special reproduction, wherein differences between adjacent frames are successively calculated in the moving image data for normal reproduction, and the moving image data for special reproduction included in the signals input by the step of inputting is generated in a section where the difference is greater than a threshold value, the moving image data for special reproduction are provided for a predetermined section in the moving image data for normal reproduction, the moving image data for special reproduction is generated at a frame rate higher than a frame rate to generate the moving image data for normal reproduction, the reproducing displays the predetermined section where the moving image data for special reproduction are present, in a form recognizable by a user, and reproduces the moving image data for special reproduction for the predetermined section, the step of reproducing reproduces the moving image data for special reproduction at a frame rate lower than a frame rate at which the moving image data for special reproduction is generated, and the program further including receiving an instruction to the effect that a user wishes to reproduce the moving image data for special reproduction for the predetermined section displayed.

\* \* \* \* \*